(12) United States Patent
Litichever et al.

(10) Patent No.: US 10,140,450 B1
(45) Date of Patent: Nov. 27, 2018

(54) VEHICLE COMMUNICATIONS BUS DATA SECURITY

(71) Applicant: Arilou Information Security Technologies Ltd., Ramat-Gan (IL)

(72) Inventors: Gil Litichever, Modiin (IL); Ziv Levi, Nahariya (IL)

(73) Assignee: ARILOU INFORMATION SECURITY TECHNOLOGIES LTD., Ramat-Gan (IL)

( * ) Notice: Subject to any disclaimer, the term of this patent is extended or adjusted under 35 U.S.C. 154(b) by 0 days.

(21) Appl. No.: 16/053,838

(22) Filed: Aug. 3, 2018

Related U.S. Application Data

(63) Continuation of application No. 15/736,306, filed as application No. PCT/IB2016/054363 on Jul. 21, 2016.

(60) Provisional application No. 62/195,419, filed on Jul. 22, 2015.

(51) Int. Cl.
| | |
|---|---|
| H04L 29/06 | (2006.01) |
| G06F 13/36 | (2006.01) |
| G06F 21/55 | (2013.01) |
| G06F 21/85 | (2013.01) |
| H04L 29/00 | (2006.01) |
| H04L 29/08 | (2006.01) |

(52) U.S. Cl.
CPC ......... *G06F 21/554* (2013.01); *G06F 13/36* (2013.01); *G06F 21/85* (2013.01); *H04L 29/00* (2013.01); *H04L 67/12* (2013.01); *H04L 67/2823* (2013.01); *H04L 69/22* (2013.01); *G06F 2221/034* (2013.01)

(58) Field of Classification Search
CPC ........ G06F 21/554; G06F 21/85; G06F 13/36; H04L 29/00; H04L 67/12; H04L 67/2823; H04L 69/22
USPC ........................................................... 726/1
See application file for complete search history.

(56) References Cited

U.S. PATENT DOCUMENTS

| | | | |
|---|---|---|---|
| 5,128,972 | A | 7/1992 | Horinouchi et al. |
| 9,560,071 | B2 | 1/2017 | Ruvio et al. |
| 2015/0020152 | A1 | 1/2015 | Litichever et al. |
| 2015/0089236 | A1* | 3/2015 | Han ............... H04L 9/3242 |
| | | | 713/181 |
| 2015/0191135 | A1 | 7/2015 | Ben Noon et al. |
| 2015/0191136 | A1 | 7/2015 | Ben-Noon et al. |

(Continued)

FOREIGN PATENT DOCUMENTS

| | | |
|---|---|---|
| WO | 2013093591 | 6/2013 |
| WO | 2013144962 | 10/2013 |

(Continued)

OTHER PUBLICATIONS

International Search Report of PCT/IB2016/054363 dated Oct. 5, 2016.

*Primary Examiner* — Michael S McNally
(74) *Attorney, Agent, or Firm* — May Patents Ltd. c/o Dorit Shem-Tov

(57) ABSTRACT

A method of real-time data security of a communications bus, the method comprising the steps of: reading at least an early portion of a message being transmitted over a communications bus, determining whether the message is suspicious, according to at least one rule applied on the read early portion of the message, and upon determining that the message is suspicious, corrupting at least a part of the message.

30 Claims, 14 Drawing Sheets

(56) References Cited

U.S. PATENT DOCUMENTS

| | | |
|---|---|---|
| 2015/0191151 A1 | 7/2015 | Ben-Noon et al. |
| 2015/0195297 A1 | 7/2015 | Ben Noon et al. |
| 2015/0271201 A1 | 9/2015 | Ruvio et al. |
| 2016/0205194 A1* | 7/2016 | Kishikawa ............ H04L 9/3242 726/1 |
| 2016/0264071 A1* | 9/2016 | Ujiie .................... B60R 16/023 |
| 2016/0294855 A1* | 10/2016 | Maeda .................... H04L 12/28 |
| 2016/0381055 A1 | 12/2016 | Galula et al. |
| 2016/0381059 A1 | 12/2016 | Galula et al. |
| 2016/0381066 A1 | 12/2016 | Galula et al. |
| 2016/0381067 A1 | 12/2016 | Galula et al. |
| 2016/0381068 A1 | 12/2016 | Galula et al. |
| 2017/0013005 A1 | 1/2017 | Galula et al. |
| 2017/0093866 A1 | 3/2017 | Ben-Noon et al. |
| 2017/0149820 A1 | 5/2017 | Ruvio et al. |
| 2017/0230385 A1 | 8/2017 | Ruvio et al. |
| 2017/0259761 A1 | 9/2017 | Ben Noon et al. |
| 2017/0318044 A1 | 11/2017 | Dagmi et al. |
| 2017/0341604 A1 | 11/2017 | Ben Noon et al. |
| 2017/0341605 A1 | 11/2017 | Ben Noon et al. |

FOREIGN PATENT DOCUMENTS

| | | |
|---|---|---|
| WO | 2013144966 | 10/2013 |
| WO | 2016125133 | 8/2016 |
| WO | 2016151566 | 9/2016 |
| WO | 2017021970 | 2/2017 |
| WO | 2017046805 | 3/2017 |

\* cited by examiner

| Field name | Length (bits) | Purpose |
| --- | --- | --- |
| Start-of-frame | 1 | Denotes the start of frame transmission |
| Identifier / arbitration field | 12 | A (unique) identifier which also represents the message priority (11 bits) with additional 1 bit remote request flag |
| Control field | 6 | Control flags including the message length |
| Data field | 0–64 (0-8 bytes) | Data to be transmitted length in the control field |
| CRC field | 16 | Cyclic redundancy check |
| ACK field | 2 | Acknowledgment by the receiver of the message |
| End-of-frame (EOF) | 7 | Must be recessive (1) |

Fig. 4

VEHICLE COMMUNICATIONS BUS DATA SECURITY

FIELD AND BACKGROUND OF THE INVENTION

The present invention relates to communications bus data security, and particularly but not exclusively, to a system and method for real-time data security of a vehicle communications bus.

Modern vehicle electronics system and industrial control systems usually connect several units in a computer network that may be exposed to many cyber threats.

For example, a modern vehicle usually has several Electronic Control Units (ECU) installed thereon.

A Vehicle's Electronic Control Unit (ECU) is an electronic system within a vehicle, having processing capabilities (e.g. a radio system is an ECU while a wiper controlled by a relay is not).

Some of the vehicle's Electronic Control Systems may include an external communication interface, i.e. an interface used or communication with devices outside the vehicle's electrical system, including devices outside the vehicle itself. Occasionally, "ECU" also stands for "Engine Control Unit" which is a special type of an Electronic Control Unit (ECU).

Automobiles become more sophisticated and increasingly use computerized technology to control critical functions and components such as brakes, engines and even steering. While computerized technology enhances the performance of the vehicle, compromising the operation of one of those safety-critical ECUs may cause a severe damage to the vehicle, passengers, and potentially, even the surroundings, for example, when the vehicle is involved in an accident with other vehicles or pedestrians.

Vehicle ECUs are usually connected in a non-secure manner, say through a CAN (Control Area network) bus. A criminal may thus manage to use a car's CAN bus, to insert malicious messages into a safety critical ECU.

Some of the ECUs which are connected to a vehicle's communication bus have external connections, such as a vehicle's telemetric ECU or Infotainment System.

Consequently, it may be possible to compromise one of the vehicle's ECUs using a cyber-attack. The compromised ECU may thus be used as an entry point for launching the cyber-attack, as known in the art.

Reference is now made to FIG. 1, which is a block diagram schematically illustrating a first exemplary modern vehicle's electrical system, as known in the art.

A first exemplary modern vehicle's electrical system includes a single communications bus 105, say a CAN (Control Area network) bus, as known in the art. The bus 105 of the exemplary electrical system connects one or more ECUs 75 and is used by the ECUs 75, to communicate with each other.

Reference is now made to FIG. 2, which is a block diagram schematically illustrating a second exemplary modern vehicle's electrical system, as known in the art.

A second exemplary modern vehicle's electrical system includes two or more communications buses (also referred to hereinbelow as bus segments) 106, say CAN (Control Area network) buses, as known in the art. Each one of the bus segments 106 of the second exemplary electrical system is connected to one or more ECUs 75 and is used by one or more of the ECUs 75, to communicate messages to/from other ECUs.

A vehicle's communication bus like the ones 105 106 schematically illustrated in FIGS. 1 and 2, is an internal communication network that interconnects components inside a vehicle and implements a communications protocol. Examples for a protocol that may be implemented by such buses include CAN, Local Interconnect Network (LIN), Flex-Ray, Vehicle Area Network (VAN), Ethernet etc., as known in the art.

Thus, each one or more of the bus segments 106 of the second exemplary system may be of a different communications protocol, of a same protocol, of a same protocol though with different configuration, etc., as known in the art.

The second exemplary modern vehicle's electrical system further includes one or more gateways or bridges 109, connected between two or more of the bus segments 106, as known in the art.

A gateway or bridge 109 connects two or more bus segments 106 and allows messages to pass between them.

Gateways and bridges are designed for transferring messages between bus segments in a reliable manner, but are usually not designed from a cyber-security perspective.

One aspect of cyber-security-directed design, as opposed to reliability-directed design, is message filtering. For example, usually, a bridge or a gateway does not discard messages out of concern that the messages may be needed and that their absence may cause harm.

Indeed, vehicle communications buses have become very susceptible to attack, say for car theft, remote manipulation of ECUs.

A further issue compromised by inadequate security on vehicle communications buses is rather a financial threat that OEMs and Tier-1 suppliers are concerned about, namely—unauthorized ECU replacement.

The owner of a vehicle may replace an existing ECU with an unauthorized or unoriginal one, for several reasons. For example, an unauthorized replacement ECU is likely to be cheaper, a replacement ECU may give a vehicle more capabilities, similarly to chip tuning (say remove limitations from the engine giving more power—although it is not in the engine's specification, and thereby make the engine more prone to malfunction, safety issues, etc,).

The financial damage to the OEMs and Tier-1 suppliers is both because their original ECU is not purchased, and because the unauthorized replacement ECU may damage the vehicle when the vehicle is still under warranty.

SUMMARY OF THE INVENTION

According to one aspect of the present invention there is provided a method of real-time data security of a communications bus, the method comprising the steps of: a) reading at least an early portion of a message being transmitted over a communications bus, b) determining whether the message is suspicious, according to at least one rule applied on the read early portion of the message, and c) upon determining that the message is suspicious, corrupting at least a part of the message.

According to a second aspect of the present invention there is provided an apparatus of real-time data security of a communications bus, the apparatus comprising: a hardware device, a message reader, implemented on the hardware device, configured to read at least an early portion of a message being transmitted over a communications bus, a determiner, in communication with the message reader, configured to determine whether the message is suspicious according to at least one rule applied on the read early portion of the message, and a message corrupter, in communication with the determiner, configured to corrupt at least a part of the message upon the message being determined to be suspicious.

According to a third aspect of the present invention there is provided a computer readable medium storing computer executable instructions for performing steps of real-time data security of a communications bus, the steps of: a) reading at least an early portion of a message being transmitted over a communications bus; b) determining whether the message is suspicious, according to at least one rule applied on the read early portion of the message; and c) upon determining that the message is suspicious, corrupting at least a part of the message.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings:

FIG. 4 is a simplified diagram schematically illustrating one exemplary CAN Bus message format.

DESCRIPTION OF THE PREFERRED EMBODIMENTS

Figure 1:
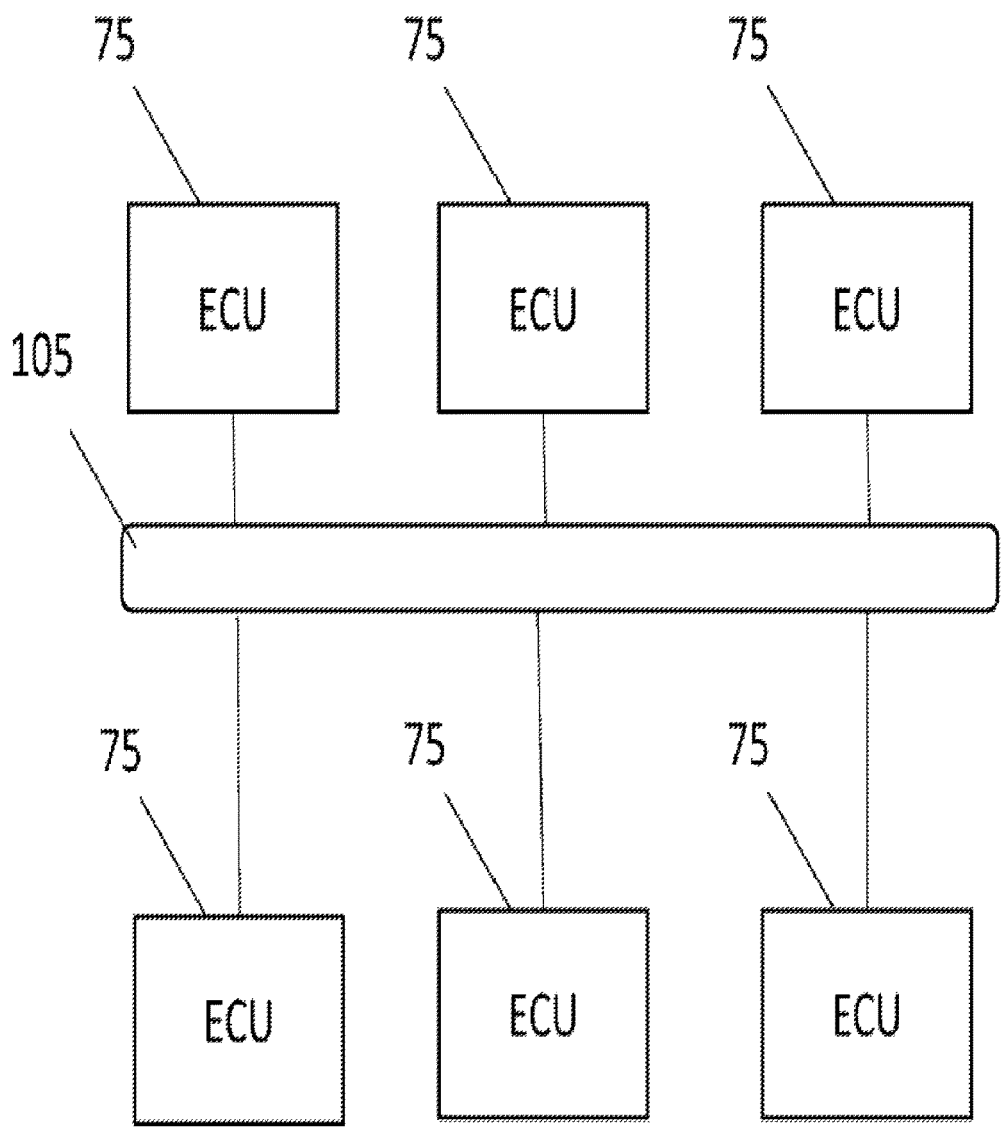
FIG. 1 is a simplified block diagram schematically illustrating a first exemplary modern vehicle's electrical system.
Figure 2:
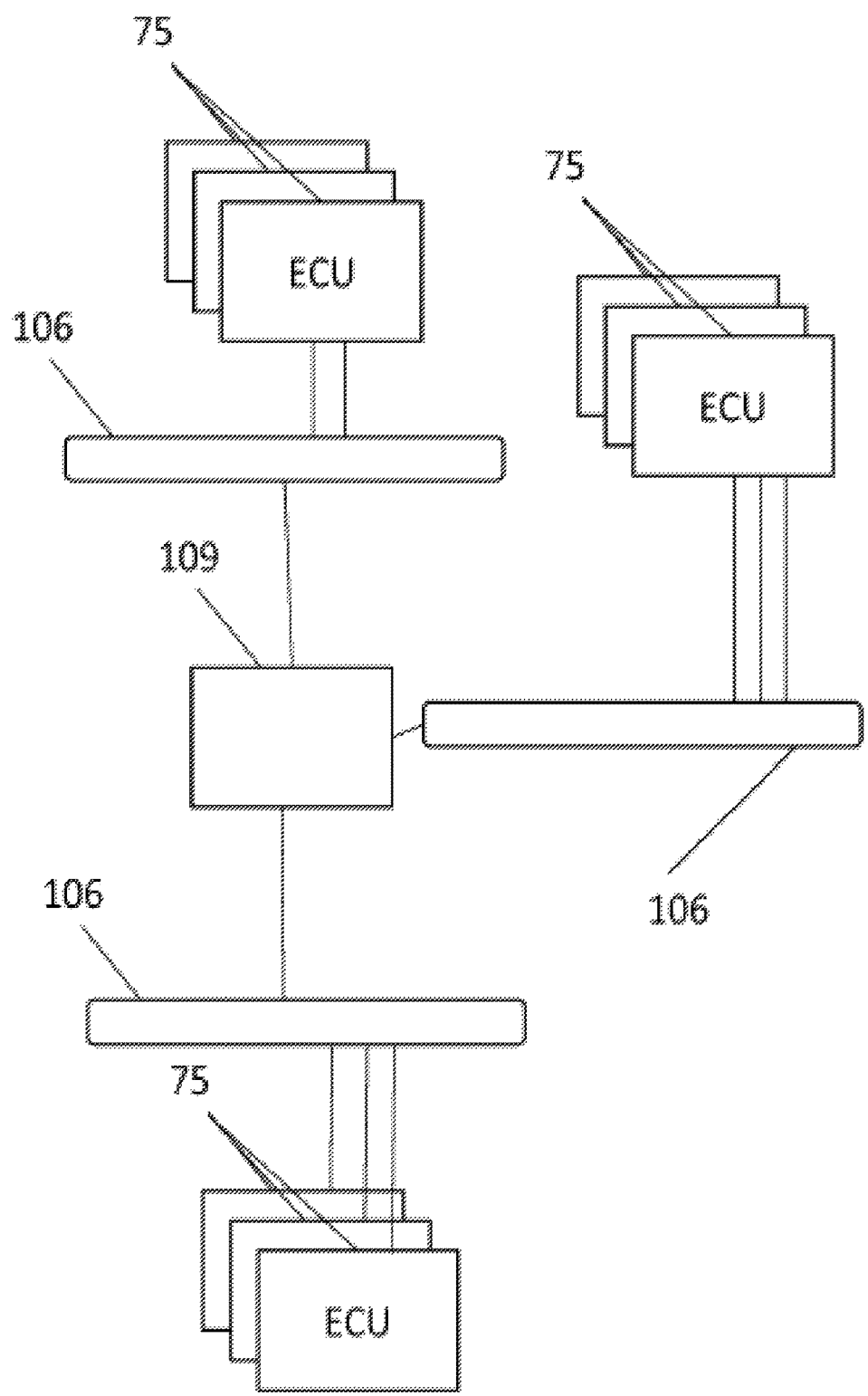
FIG. 2 is a simplified block diagram schematically illustrating a second exemplary modern vehicle's electrical system.

The present embodiments comprise an apparatus and method of real-time data security of a communications bus.

A communications bus, say a CAN bus installed in a vehicle and used for communicating messages from an ECU (Electronic Control Unit) or to an ECU, may be susceptible to attack using malicious messages.

Indeed, in recent years, vehicle communications buses have become very susceptible to attack, say for car theft, remote manipulation of ECUs, etc., as described in further detail hereinabove.

The susceptibility of a vehicle to malicious attacks using messages sent over the vehicle's bus is likely to grow even further with the introduction of autonomous cars such as the self-driving car developed by Google™, since such cars rely much more heavily on fully autonomous critical car systems.

In one example, a message inserted into the CAN bus, say by manipulation of an ECU connected to the internet, carried out over the internet, may bear malicious content.

The malicious content may include, but is not limited to: instructions for an ECU in control of the vehicle's anti-theft system to turn off the anti-theft system, computer code that may be used to remotely control an ECU that controls a critical system (say the vehicle' breaking system), etc., as known on the art.

In one exemplary embodiment of the present invention, an early portion of a message in transmission over a communications bus, is read, say using an apparatus implemented on a device installed on a vehicle, before the whole message is read, potentially, even before the whole message is received by the device.

For example, the early portion may be read by sampling a controller connected to the bus, while the controller is still in the midst of receipt of the stream of bits that makes up the message—i.e. while the message is still being received on the device.

Actually, since controllers connected to a bus such as a CAN bus, read the content of the bus in real-time (i.e. immediately upon receipt of any bit of the message on the bus), the method of the exemplary embodiment may thus provide for a data security solution, in which the early portion of the message is read before all message bits are received on the bus.

This reading of the early portion of the message may enable the invalidation or discarding of a message when determined to be suspicious, before the whole message is received on the bus, thus preventing the reading of the message by an ECU that the message is destined for, as described in further detail hereinbelow.

In a first example, a hardware device is installed in proximity of the communications bus but is not connected to the bus.

In the example, the early portion of the message is read after some (but not all) of the bits that make up the message are received using electromagnetic induction, while the message is still being transmitted over the bus, say using an induction probe, as described in further detail hereinbelow.

In a second example, the device is rather physically connected to the bus or to a segment of the bus, and the early portion of the message is received on the device through a wired connection to the bus.

The early portion may include, for example, one or more bytes of the message that are read prior to reading of the whole message—i.e. one or more of the message's leading bytes.

The early portion may thus be either a consecutive or a non-consecutive portion of the message, say a portion made of non-consecutive bytes that are read prior to reading of the whole message. Further, the read bytes may make up a small portion of the message, or rather a large part of the message, but not the entire message.

The read early portion of the message is used for determining whether the message is suspicious, according to at least one rule applied on the read early portion of the message, say according one or more of the message fields contained in the read portion, etc., as described in further detail hereinbelow.

Optionally, the rules are defined by an operator, a programmer, a logic circuit designer, etc., as described in further detail hereinbelow.

Finally, if there is determined that the message is suspicious, there is corrupted at least a part of the message, thereby invalidating the message, as described in further detail hereinbelow.

The exemplary method may thus potentially prove uniquely effective against a kind of a "real time" attack that targets critical car functions, since with the exemplary method, the suspicious message may be invalidated by corruption, before the whole message is read or even received on any ECU of the vehicle, as described in further detail hereinbelow.

Thus, in one example, a message bearing malicious code that when read by an ECU that controls a vehicle's breaking system, immediately activates the vehicle's breaks, potentially causing a car accident, is sent over the communications bus.

In the example, the message is detected to be suspicious when only an early portion of the message is read, and is thus likely to be corrupted before the whole message is received on the bus, and therefore prior to being read in full by the ECU that controls the vehicle's breaking system.

More specifically, as known in the art, an ECU's controller (say a CAN controller), does not expose the message to the ECU's processor (say a CPU or logical circuit of an ECU used to control the breaking system) until all bits of the message are received by the controller.

Further, the ECU's CAN controller does not expose the message to the ECU's processor if the message is not valid according to a CAN protocol, as known in the art, and thus only valid messages are exposed on the ECU's CAN controller, say on a buffer, for the ECU's processor to read.

Thus, when the message determined to be suspicious is invalidated as a result of the corruption, the controller never exposes the message to the ECU's processor and the ECU's processor never reads the message that carries the malicious content.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Figure 3:
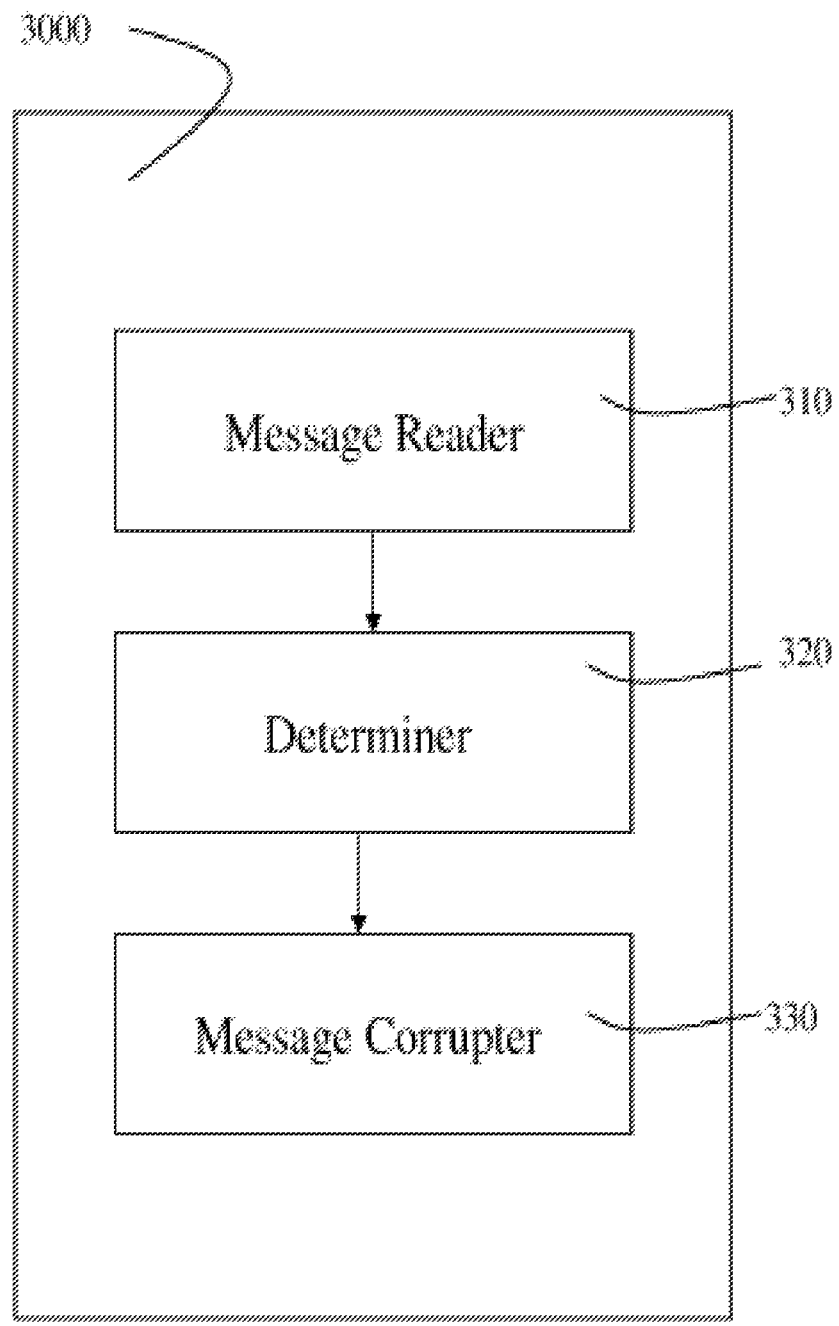
FIG. 3 is a simplified block diagram schematically illustrating a first exemplary apparatus of real-time data security of a communications bus, according to an exemplary embodiment of the present invention.

Reference is now made to FIG. 3, which is a simplified block diagram schematically illustrating a first exemplary apparatus of real-time data security of a communications bus, according to an exemplary embodiment of the present invention.

An apparatus 3000 of real-time data security of a communications bus, according to an exemplary embodiment of the present invention, may be implemented on a hardware device.

The hardware device may include but is not limited to a computer processor (CPU), a microcontroller, a controller, an FPGA (Field-Programmable Gate Array) circuit, an ASIC (Application Specific Integrated Circuit), etc., or any combination thereof. Optionally, the device is a part of an ECU (Electronic Control Unit), as described in further detail hereinbelow.

For example, the apparatus 3000 may be implemented as a hardware device that includes one or more computer processors, one or more controllers, one or more electronic circuits, and one or more computer memories that store(s) computer code run by the computer processor(s) when the apparatus 3000 is active, etc., as described in further detail hereinbelow.

The exemplary apparatus 3000 may thus include one or more hardware components (say circuits, computer processors, controllers, etc.), one or more software components, etc., or any combination thereof.

The exemplary apparatus 3000 illustrated in FIG. 3, includes a hardware device and one or more additional parts that are implemented on the hardware device or are in communication with the hardware device, as described in further detail hereinbelow, say the parts denoted 310-330 in FIG. 3.

Each one of the additional parts may be implemented as software—say by programming a computer processor of the hardware device to execute steps of one of the methods described in further detail hereinbelow, as hardware (say as one or more electric circuits), or as any combination thereof. Each one of the additional parts 310-330 may thus be configured (say by programming or circuit designing) to perform one or more steps of exemplary method described in further detail hereinbelow.

The exemplary first apparatus 3000 includes a message reader 310, as described in further detail hereinbelow.

The message reader 310 reads at least an early portion of a message being transmitted over a communications bus.

The bus may be, but is not limited to a vehicle's communication bus such as a CAN bus, a Local Interconnect Network (LIN) bus, a Flex-Ray bus, a Vehicle Area Network (VAN) bus, an Ethernet bus, etc., as known in the art.

Optionally, the message reader 310 reads the early portion of the message before the whole message is read by the message reader 310, as described in further detail hereinbelow.

Optionally, the message reader 310 reads the early portion even before the whole message is received on the hardware device of the apparatus 3000, as described in further detail hereinbelow.

Optionally, the message reader 310 reads the early portion by sampling a controller' s buffer or by receiving at least the early portion of the message from the controller.

In one example, the message reader 310 is implemented on a processor (say a CPU or an electric circuit), and early bits of the message that are received by a receive block implemented on the controller, are parsed by the receive block into a format readable by the processor, thus creating the early portion. The receive block further exposes the early portion to the processor (say in a buffer), for the message reader 310 to read, as described in further detail hereinbelow.

In the example, the controller is a part of the hardware device, and is electrically connected to the communications bus for sensing the bits present on the bus, or is otherwise able to sense the bits present on the bus, thus receiving the stream of bits that make up the message, as described in further detail hereinbelow.

In the example, the message reader 310 reads the early portion while the controller (and more specifically, the receive block implemented therein) is still in the midst of receipt of the stream of bits that makes up the message—i.e. while the message is still being received on the hardware device.

Controllers connected to a bus (say a CAN bus), sense the content of the bus in real-time (i.e. immediately upon arrival of any bit of the message on the bus), thus enabling the message reader 310 to read the early portion of the message before all message bits are received on the bus (i.e. before remaining bits of the message are even received on the bus.)

The reading of the message while not all message bits have been received on the bus, may enable the invalidation or deletion of a suspicious message before the whole message is received on a bus connected to an ECU that the message is destined for, thus preventing the message's reading by the ECU's processor (say CPU or logic circuit), as described in further detail hereinbelow.

In a first example, the hardware device is installed in proximity of the communications bus and the message reader 310 reads the early portion of the message using electromagnetic induction.

In the example, a controller installed on the hardware device of the apparatus 3000 uses an induction probe to sense the status of the bus, and thereby receives bits of the message being transmitted over the bus, as described in further detail hereinbelow. The induction probe is thus used by the controller to receive leading bits of the message when transmitted over the bus, using electromagnetic induction, and the received bits are parsed and exposed by the controller (say using a buffer), and then read by the message reader 310.

In a second example, the hardware device is rather physically connected to the bus or to a segment of the bus, and the early portion of the message is received on the device through a wired connection of a controller that is a part of the hardware device of the apparatus 3000, to the bus, as described in further detail hereinbelow.

The early portion may include, for example, one or more bytes of the message that are read by the message reader 310 prior to reading of the whole message—i.e. one or more of the message's leading bytes.

The early portion read by the message reader 310 may be either a consecutive or a non-consecutive early portion of the message, say a portion made of non-consecutive ones of the bytes that are read prior to reading of the whole message. Further, the read bytes may make up a small portion of the message, or rather a large part of the message, but not the entire message.

Optionally, the message reader 310 rather reads the whole message—i.e. not only the early portion thereof, as described in further detail hereinbelow.

The apparatus 3000 further includes a determiner 320, in communications with the message reader 310, as described in further detail hereinbelow.

Optionally, the determiner 320 determines whether the message is suspicious according to at least one rule applied on the early portion of the message that is read by the message reader 310, as described in further detail hereinbelow.

Alternatively, when the message reader 310 reads the whole message, the determiner 320 determines whether the message is suspicious according to at least one rule applied on the whole message, as described in further detail hereinbelow.

The one or more rules may include, but are not limited to one or more rules applied on properties of the message, on the message header, on content of one or more message fields contained in the read portion (or whole message), on the message's length, on the message's sending time (say date, hour, etc.), etc., as known in the art.

The rules may additionally or alternatively include rules that are based on context of the message's receipt on the bus, such as message rate (say a sudden rise in the number of messages sent over the bus during a denial of service attack), properties of a message received just before the message, state of one of the vehicle's systems (say an ECU), etc., as known in the art.

The one or more rules may further be based on a black list of senders, on a white list of senders, etc., or any combination thereof, as known in the art.

Optionally, the one or more rules are predefined by a programmer, circuit designer, or user of the apparatus 3000, say by programming, circuit designing, or using a GUI (Graphical User Interface), etc., as known in the art.

The apparatus 3000 further includes a message corrupter 330, in communications with the determiner 320, as described in further detail hereinbelow.

When the determiner 320 determines that the message is suspicious, the message corrupter 330 corrupts at least a part of the message, say by changing one or more bits of the message, say for introducing an error into the message and thereby invalidating the message, as described in further detail hereinbelow.

Optionally, the message corrupter 330 corrupts the message by changing one or more bits of the message, on the communications bus that the message is communicated over when read by the message reader 310—say using an induction probe, or when the hardware device in connected to the bus in parallel, as described in further detail hereinbelow.

Alternatively, the message corrupter 330 corrupts the message on a second communications bus—say a one that is used to send the message from the hardware device of apparatus 3000—see for example, in the "cut-through" scenarios, as described in further detail hereinbelow.

Optionally, by corrupting the message, the message corrupter 330 renders the message invalid according to a communications protocol of the communications bus, say according to the CAN bus protocol implemented on a vehicle's or factory's CAN bus.

Optionally, the message corrupter 330 corrupts the message by inserting a CAN Error Frame into the message.

A standard CAN Error Frame includes a sequence of six or more consecutive identical bits that are also referred to as the error frame's Error Flag, and are usually followed by a sequence of eight consecutive recessive bits (i.e. eight T bits) that are also referred to as the error frame's Error Delimiter, as known in the art.

When the Error Flag includes six or more dominant (O) bits the Error Frame is called an Active Error Frame, and when the Error Flag includes six or more recessive (T) bits the Error Frame is called a Passive Error Frame, as known in the art.

Thus, when the corruption is done on the hardware device of the apparatus 3000 itself, as possible, for example, with one of the "Cut Through" scenarios below, the message corrupter 330 may insert the error message as either a passive error frame of an active error frame.

However, when the hardware device is rather connected to the bus in parallel or senses the bus content using a probe, the message corrupter 330 has to corrupt the message on the bus, which can only be done by changing one or more recessive bits to active, as described in further detail hereinbelow.

Thus, in a first example, the communications bus is a CAN (Control Area Network) bus and the message corrupter 330 corrupts the message determined to be suspicious, by inserting a frame equivalent to a CAN Error Frame into the CAN bus, when the message is still being transmitted over the communication bus. This can be done only by changing one or more recessive bits to active. The inserted frame equivalent to a CAN Error Frame thus includes the error flag of an Active Error Frame, but not necessarily the Error Delimiter, as described in further detail hereinbelow.

Optionally, by changing one or more bits of the message, the message corrupter 330 leaves a sequence of at least six consecutive identical bits in the message, and thereby invalidates the message by inserting a CAN Stuffing Error into the message, as described on further detail hereinbelow.

A CAN stuffing error occurs whenever a message contains a sequence of six or more consecutive identical bits, as known in the art.

Optionally, the early portion read by the message reader 310 includes the entire message but the CRC (Cyclic Redundancy Check) associated with the message, and the message corrupter 330 changes at least one bit of the CRC associated with the message on the bus, and thereby invalidates the message, as described on further detail hereinbelow.

Optionally, the message corrupter 330 corrupts the message determined to be suspicious before all bits of the message are received on the communications bus, as described in further detail hereinbelow.

Optionally, the apparatus 3000 further includes a message delayer (not shown in FIG. 3), as described in further detail hereinbelow.

The message delayer delays transmission of at least a part of the message to the communications bus (or to a segment thereof), say when the hardware device of the apparatus 3000 is connected between two bus segments, as described in further detail hereinbelow.

In some examples, the message delayer delays transmission of at least a part of the message until the determiner 320 determines that the message is not suspicious, or for a period of time likely to provide enough time for the determiner 320 to determine whether the message is suspicious, as described in further detail hereinbelow.

Optionally, the apparatus 3000 further includes a bus monitor (not shown in FIG. 3), as described in further detail hereinbelow.

The bus monitor monitors the bus, and upon detecting that the bus is busy, conveys an indication that the bus is busy to the message delayer, to a controller that receives the message's bits on the hardware device, or to both, as described in further detail hereinbelow. Then, the message delayer or the controller delays transmission of at least a part of the message over the communications bus, as described in further detail hereinbelow.

Optionally, the apparatus 3000 further includes a message discarder (not shown in FIG. 3), in communication with the determiner 320, as described in further detail hereinbelow.

When the determiner 320 determines that the message is suspicious, the message discarder deletes at least a part of the message, say using one of the controller's parts, as described in further detail hereinbelow.

Optionally, the apparatus 3000 further includes an induction probe (not shown in FIG. 3), and the message reader 310 uses the probe for reading the portion of the message, using electromagnetic induction, and possibly, to corrupt the message too, as described in further detail hereinbelow.

With the exemplary apparatus 3000, a suspicious message may thus be invalidated by corruption, before the whole message is read or even received on any ECU of the vehicle, as described in further detail hereinbelow.

Thus, in one example, a message bearing malicious code may be detected to be suspicious when only an early portion of the message is read, and is thus likely to be corrupted before the whole message is received on the bus, and thus prior to being read in full by an ECU that the message determined to be suspicious is destined to.

Specifically, in the example, the ECU's controller is a standard CAN Controller.

Usually, a standard CAN Controller exposes the message, for the CPU or circuit to read, only after all bits of the message are received by the controller and the message is found to be valid according to CAN protocol rules, as known in the art.

As a result, when the message is invalidated through corruption by the message corrupter 330, the ECU's CAN controller does not expose the message for the CPU or logical circuit to read, thus preventing the malicious code carried by the message from reaching the CPU.

Indeed, most modern vehicles employ a CAN (Control Area Network) communications bus, i.e. a CAN bus.

CAN (or CAN bus) is a vehicle bus standard designed to allow electrical systems to communicate with each other within a vehicle without a host computer (i.e. no master is required on the bus.)

Thus, ECUs in a vehicle usually communicate by accessing a CAN bus. However, CAN bus is also used in systems that are not vehicle systems, particularly in Industrial Control Systems.

The CAN bus protocol is a broadcast protocol mainly used by the automotive industry. There is more than one CAN bus version, however. Further, a car manufacturer may install in the vehicle a communications bus that is configured specifically for that car model.

According to one version of the CAN bus protocol, messages transmitted over a CAN bus must comply with the format illustrated in FIG. 4. However, current CAN protocol versions further provide a few variations of the CAN bus format, such as an extended format that includes a 29 bits long ID field, or the CAN FD flexible data rate format introduced in recent years.

The following exemplary embodiments illustrate an implementation of apparatus 3000 wherein the communication bus is a CAN bus. Even when being described in connection with a vehicle bus, none of the presented exemplary apparatuses, methods or scenarios should be construed as limited to a vehicle environment. The presented embodiments may therefore be implemented in connection with non-vehicle CAN buses as well.

Figure 5:
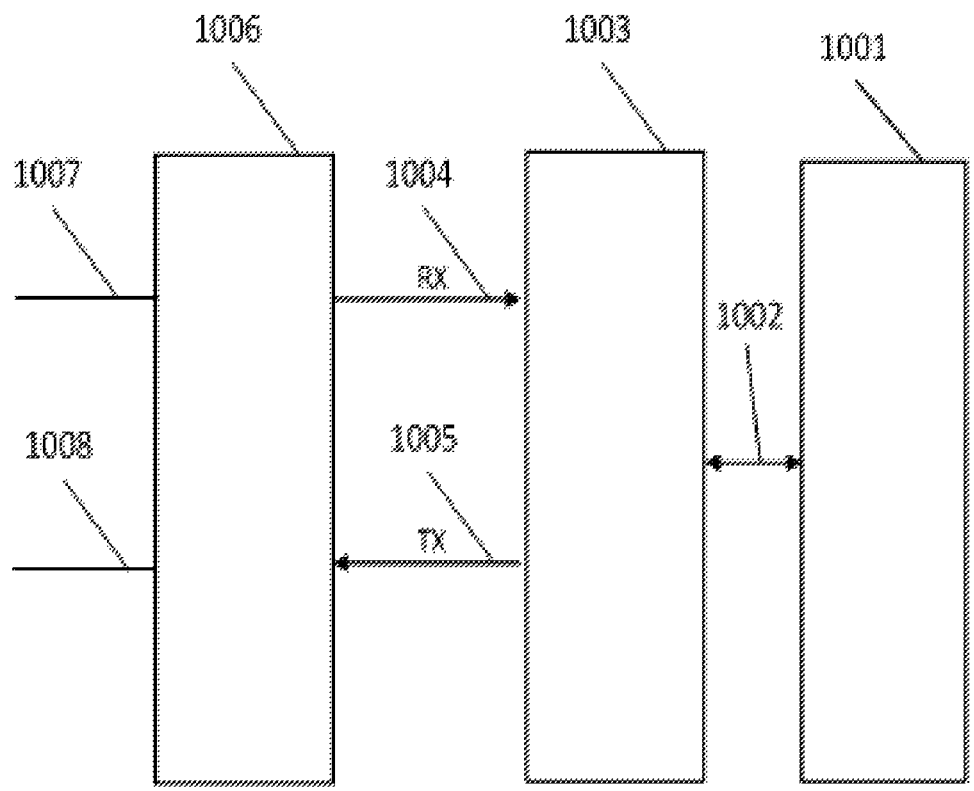
FIG. 5 is a simplified block diagram schematically illustrating a second exemplary apparatus of real-time data security of a communications bus, according to an exemplary embodiment of the present invention.

Reference is now made to FIG. 5, which is a simplified block diagram schematically illustrating a second exemplary apparatus of real-time data security of a communications bus, according to an exemplary embodiment of the present invention.

The physical layer of a CAN bus is implemented as a differential bus that includes a high wire 1007 and a low wire 1008, as known in the art.

With the second exemplary apparatus, the physical layer 1007 1008 of the CAN bus is analyzed by a transceiver 1006 that may be implemented, in a non-limiting example, on a PHY (Physical Layer) Chip, as known in the art.

The transceiver 1006 is thus an interface that translates the CAN bus physical layer 1007 1008 data that represent the message's bits on the bus, to logical level data—say to CMOS or TTL voltage levels, as known in the art.

The logical level data is transmitted through a controller's RX line 1004, to a controller 1003, say a modified CAN controller or another controller. Similarly, Logical data originating from the controller 1003 may be received by the transceiver 1006 through a controller TX line 1005.

The logical level data is analyzed by the controller 1003 that may reside on a microcontroller or an application chip, and the controller 1003 parses the data into a format readable by a processor 1001 (say a Central Processing Unit (CPU), a Microprocessor Unit (MPU), a logical circuit, etc.).

Unlike a standard CAN controller, the controller 1003 does not wait for all the CAN message's bits to be received on the controller 1003 before exposing the message to the processor 1001, say on a buffer readable by the processor 1001.

Optionally, the processor 1001 and the controller 1003 are a part of a same unit and communicate internally (say via an internal bus line 1002, a register interface or any other means of internal communication within a CPU/microprocessor/system on chip).

Alternatively, the processor 1001 (say CPU) is implemented on an external chip that is connected through a bus 1002—say a one based on SPI (Serial Peripheral Interface), I2C (Inter-Integrated Circuit), UART (Universal Asynchronous Receiver/Transmitter), PCI (Peripheral Component Interconnect), or any other known in the art chip interconnect protocol, to the controller 1003.

The physical layer of the bus (1007, 1008) is shared thus making every transceiver 1006 (and any similar transceiver) connected to the bus aware of the state of the bus in real time.

The physical layer of the bus (1007, 1008) has two states: a dominant state that represents a dominant (0') bit and a recessive state that represents a recessive (T) bit. When the bus is in the recessive state, each transmitter that is connected to the bus can change the state of the bus to dominant, as known in the art.

The second exemplary apparatus also includes apparatus 300 implemented on the processor 1001, and thus includes at least parts 310-330 of apparatus 3000, say as computer code executed by the processor 1001. Optionally, the second apparatus further includes any one or more of the optional apparatus 3000 parts—that may also be implemented as computer code executed by the processor 1001.

On most currently CAN buses, messages transmitted on the bus, would have to be completely received by the controller 1003 before being exposed to the processor 1001, as known in the art.

However, with the second apparatus illustrated using FIG. 5, an early portion of a message may be exposed to the processor 1001—say on the controller's 1003 buffer, while remaining bits of the message are still transmitted over the bus 1007 1008 and received by the transceiver 1006 and controller 1003.

Thus, optionally, while the message is still being transmitted over the bus 1007 1008 and received by the transceiver 1006 and controller 1003, and before all bits that make up the message are received on the bus, the message reader 310 reads the early portion of the message and the determiner 320 determines if the message is suspicious, based on the read portion only.

Alternatively, the message reader 310 reads the whole message and not only the early portion of the message and the determiner 320 determines if the message is suspicious, based on the whole message.

Further, when the determiner 320 determines that the message is suspicious, the message is corrupted by the message corrupter 330.

In a first example, the message corrupter 330 corrupts the message by instructing the transceiver 1006 to insert one or more dominant bits where there should be a recessive bit, while the message is still being transmitted over the bus, for creating a CAN CRC error.

In a second example, the message corrupter 330 corrupts the message by sending a CAN bus error frame (or an equivalent frame) over the bus while the message is still being transmitted over the bus, as described in further detail hereinabove.

The message may thus be "blocked" by corrupting messages sent by other nodes (say an ECU), thus making sure no node (say another ECU) connected to the CAN bus reads the message.

The message may also be "discarded", say by deleting at least a part of the message when passing through the hardware device of apparatus 3000, in a case in which the hardware device is connected between two bus segments (that may actually be two buses with different protocols), as described in further detail hereinbelow.

Figure 6:
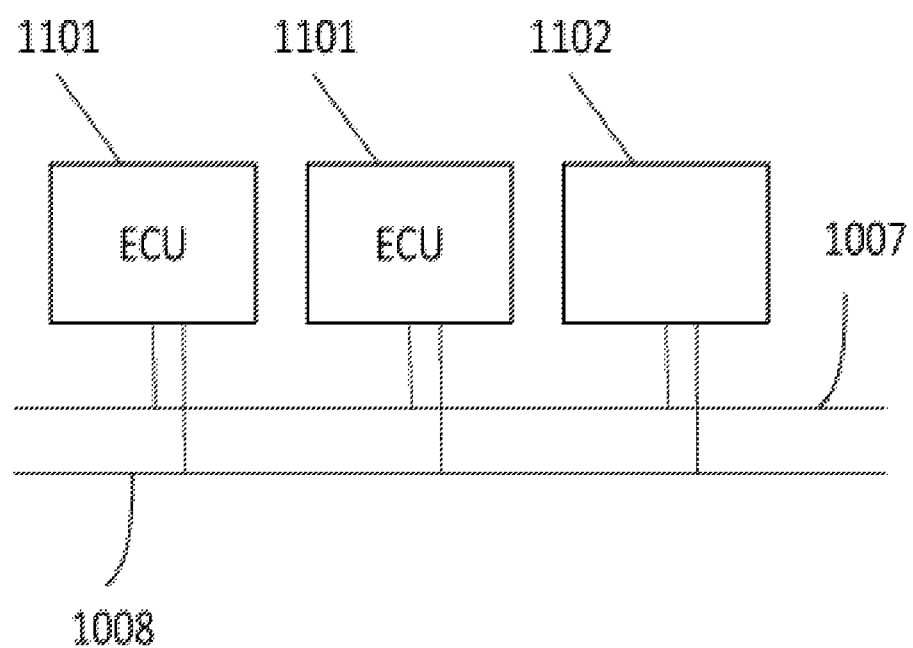
FIG. 6 is a simplified block diagram schematically illustrating a first scenario of real-time data security of a communications bus, according to an exemplary embodiment of the present invention.

Reference is now made to FIG. 6, which is a simplified block diagram schematically illustrating a first scenario of real-time data security of a communications bus, according to an exemplary embodiment of the present invention.

In this scenario, apparatus 3000 parts 310-330 are implemented on a central unit 1102 that is a hardware device connected to a CAN bus 1007 1008 that is also connected to one or more ECUs 1101. In the example, the hardware device 1102 is connected on the bus in parallel to the ECUs 1101.

In the first scenario, which is also referred to hereinbelow as a "wired CAN message blocking" scenario, the hardware device includes the transceiver 1006, controller 1003 and processor 1001 of the second apparatus, as illustrated in FIG. 5 hereinabove.

Further in the first scenario, apparatus 3000 is implemented on the processor 1001.

Optionally, in the first scenario, the controller 1003 is a CAN Controller modified using computer code, an electric circuit such as ASIC (Application Specific Integrated Circuit), FPGA (Field-Programmable Gate Array), etc., or any known in the art means for integrating logic into a chip, so as to have the following additional features:

1. Bits of the message that are received by the controller 1003 are parsed by the controller into a format readable by the processor (say CPU) 1001, and forwarded to the processor, before the whole message is received—i.e. while the controller 1003 is still in the midst of receiving the message, and not all bits of the message are received on the bus. By this, the message reader 310 is allowed to read an early portion of the message (i.e. only a portion of the message). The processor 1001 can be a part of the controller 1003 or rather a part of a separate chip.
2. The processor 1001 is also able to command the controller 1003 to corrupt the message, thus invalidating the message and forcing any CAN controller of one of the ECUs connected in parallel to the CAN bus to avoid exposing the message to the ECU's CPU, delete the message, or ignore the message, as prescribed by the CAN bus protocol for invalid messages.

In one example, the relevant parts of the message that the determiner 320 implemented on the processor 1001 relies on for determining if the message is suspicious are the message's CAN ID field, data fields, metadata fields, etc., or any combination thereof (say rate, timing, flags, message length, etc.). The relevant parts are included in the early (but not necessarily consecutive) portion of the message that is exposed to the processor 1001, for the message reader 310 to read.

In the example, the determiner 320 may use one or more rules for determining if the message is suspicious, say according to the message's timing, sender, etc., as known in the art and as described, for example in PCT/IL020//202092.

In the example, the determiner 320 may determine that the message is suspicious as early as the ID is received and read, or rather when later bits of the message, that represent other message fields are received.

Some CAN controllers may have the inherent capability to sample the CAN message before it is completely received and therefore may not necessarily require a modification of the sort described in further detail hereinabove.

For such controllers, polling the relevant data registers of the controller 1003 while the message is still being received, can expose the message ID and/or data and/or message metadata.

Alternatively to polling, one of the standard CAN controller's pins may be a pin configured for sending interrupts when a change is detected on the CAN receive pin. This pin can be an additional pin or the same CAN controller pin designated for receiving CAN messages.

When the determiner 320 determines that the message is suspicious, the message corrupter 330 corrupts the message, say using one of the controller's 1003 parts, as described in further detail hereinbelow.

In the first scenario, the message corrupter 330 may corrupt the message while the message is still being transmitted over the bus, say by changing one or more of the message's bits from recessive to dominant, as described in further detail hereinbelow.

Figure 7:
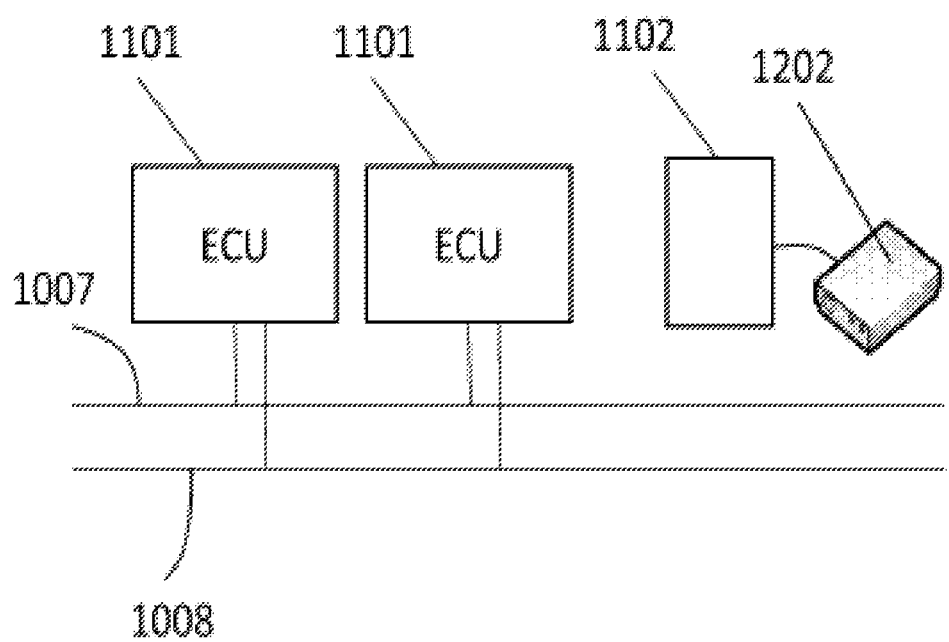
FIG. 7 is a simplified block diagram schematically illustrating a second scenario of real-time data security of a communications bus, according to an exemplary embodiment of the present invention.

Reference is now made to FIG. 7, which is a simplified block diagram schematically illustrating a second scenario of real-time data security of a communications bus, according to an exemplary embodiment of the present invention.

In the second scenario, the hardware device 1201 of apparatus 3000 is not physically connected to the bus 1007 1008. However, the apparatus 3000 further includes an induction probe 1202 that is wirelessly or by-wire connected to the hardware device 1201, and is used to receive bits of the message, using electromagnetic induction.

As a result, the message reader 310 reads the early (but not necessarily consecutive) portion of the message using induction.

For example, the hardware device 1201 may include a controller 1003 that is installed on the hardware device 1201 and is connected to the probe 1202, by wires.

The controller uses the probe 1202 to sense the bus through electromagnetic induction.

The controller 1202 thereby receives bits of the message as the bits are being received on the bus, and before the whole message is received on the bus, forwards the early portion of the message (that is the result of parsing the already received bits) to the processor 1001, for the message reader 310 to read.

In the second scenario, as the hardware device 1201 is not directly connected to the CAN bus 1007 1008, but rather uses the induction probe 1202 as a sensor of the state of the bus, the hardware device 1201 can only receive messages, but cannot send any messages (say error messages) over the CAN bus 1007 1008.

However, the message corrupter 330 is able to interfere with the communication on the bus using induction methods.

More specifically, in one example, the message corrupter 330 may corrupt one or more bits of a message being transmitted over the bus, when determined to be suspicious, by sending a high voltage/current pulse that changes one or more recessive bit of a message into a dominant bit, on the bus, using the probe, thus corrupting the message on the bus.

In quite a similar scenario, instead of receiving message bits through induction, the controller's 1003 RX line 1004 does connect the transceiver 1006 and the controller 1003. However the TX line 1005 does not connect the controller 1003 to the transceiver 1006. Instead, the TX line 1005 connects the transceiver 1006 to a general purpose I/O line on the processor (say CPU) 1001 that is unable to send CAN messages directly.

However, the I/O line may still be used by the message corrupter 330 implemented on the processor 1001, to corrupt the message determined to be suspicious, by changing one or more recessive bits to dominant, on the bus, as described in further detail hereinabove.

Alternatively, the message corrupter 330 may erase all messages transmitted on the bus by making the bus dominant for a specified period of time—during which time the bus is thus neutralized.

Figure 8:
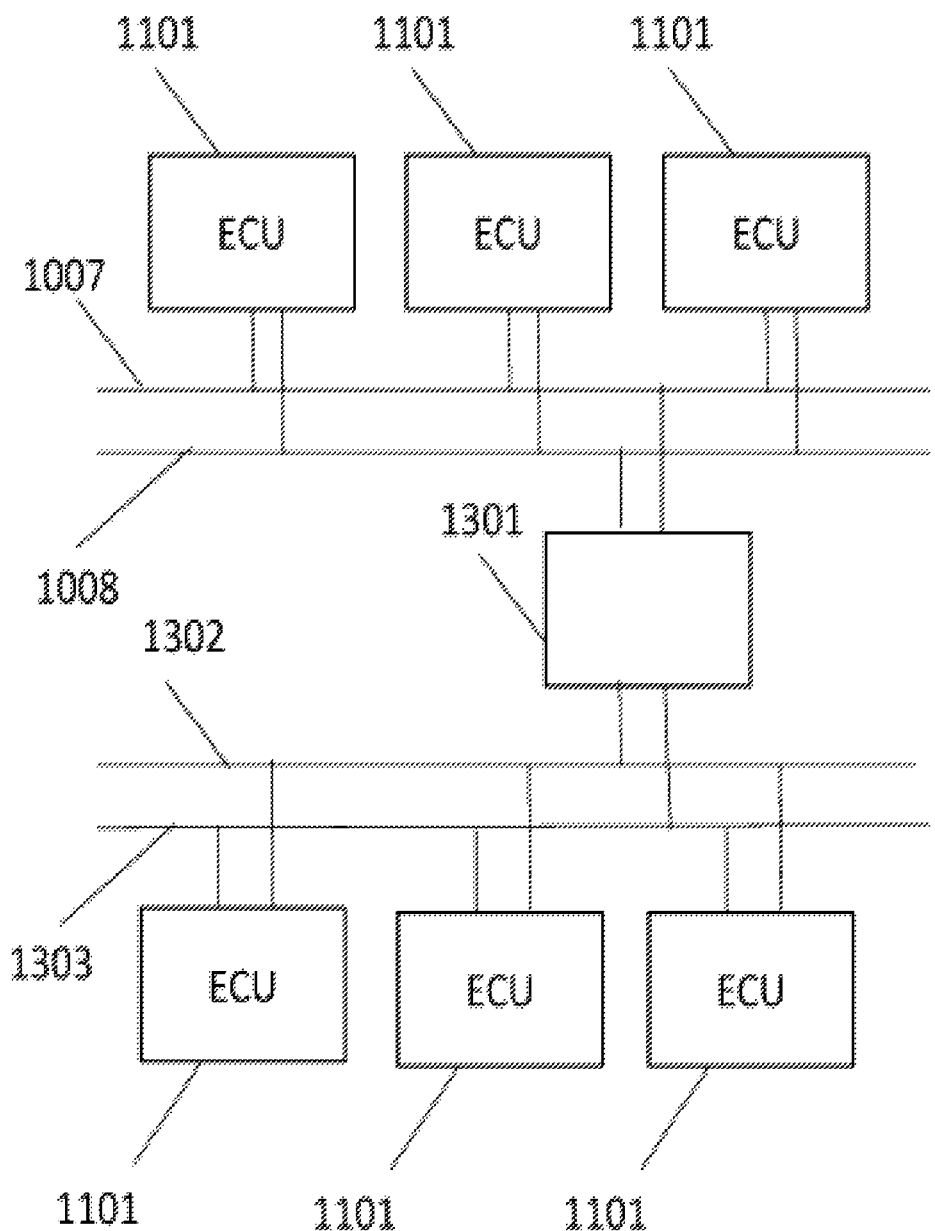
FIG. 8 is a simplified block diagram schematically illustrating a third scenario of real-time data security of a communications bus, according to an exemplary embodiment of the present invention.

Reference is now made to FIG. 8, which is a simplified block diagram schematically illustrating a third scenario of real-time data security of a communications bus, according to an exemplary embodiment of the present invention.

Optionally, in the third scenario, also referred to hereinbelow as a "cut through" scenario, a hardware device 1301 on which the parts 310-330 of apparatus 3000 are implemented, is physically connected between two bus segments (which may actually be two different buses). Further in this scenario, each segment connects one or more ECUs 1101 in parallel.

Alternatively, in the "cut through" scenario, the hardware device 1301 is rather connected between a single ECU and a single bus (say only the first segment), or rather is installed inside the ECU, forming a part of the ECU (say between the ECU's own CAN Controller and the bus.)

In one example, the hardware device 1301 is connected between the physical layer of a first CAN bus segment (high wire 1007 and low wire 1008), and the physical layer of a second CAN bus segment (high wire 1302 and low wire 1303), as described in further detail hereinbelow.

In store and forward scenarios implemented on current devices connected between two (or more) bus segments, only after a whole message is received from a first segment, is a decision on whether to forward the message to the second segment or not, made, and a forwarding of the message started.

According to one embodiment of the present invention, the latency of the message forwarding between bus segments may by shortened, compared to current stored and forward scenarios, by starting the forwarding of the message received on a first bus to a second bus when not all bits of the message have been received on the first bus.

Specifically, the forwarding of the message bits to the second bus segment starts while the bits of the message are still in the midst of being received on the hardware device 1301—i.e. before the whole message is received on the hardware device that is connected between the bus segments.

In one example, while the message is still in the midst of being received on the hardware device 1301, an early portion of the message is read by the message reader 310, and the determiner 320 determines whether the message is suspicious, as described in further detail hereinbelow.

In a second example, only after the message is received in full (i.e. after receiving all bits), is the message read by the message reader 310, which thus reads the whole message rather than only a portion of the message.

If the determiner 320 determines that the message is suspicious, the message corrupter 330 corrupts the message by changing one or more bits of the message on the second bus, or rather (for bits not forwarded to the second bus segment yet) on the hardware device 1301, as described in further detail hereinbelow.

The hardware device 1301 may be connected between two CAN TTL/CMOS level devices, as illustrated using FIG. 9-12 hereinbelow.

FIG. 9-12 schematically illustrate entities, some of which entities may communicate via connections, as shown in FIG. 9-12. A connection may be implemented, for example, as a wired or wireless channel, hub, or any other known in the art means for communications between two or more entities, as described in further detail hereinbelow.

Some of the figures show blocks. A block may implemented for example, on a modified CAN Controller, or another controller, say as computer code, electric circuit, etc., as known in the art.

Figure 9:
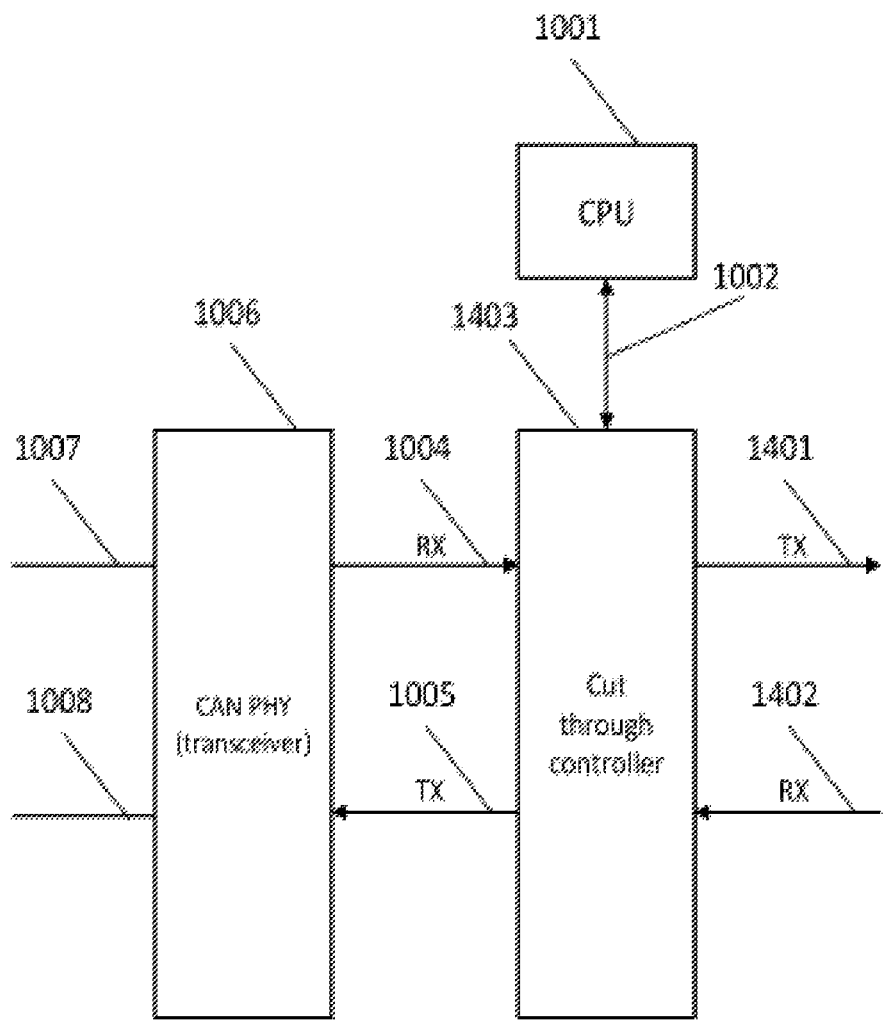
FIG. 9 is a simplified block diagram schematically illustrating a fourth scenario of real-time data security of a communications bus, according to an exemplary embodiment of the present invention.

Reference is now made to FIG. 9, which is a simplified block diagram schematically illustrating a fourth scenario of real-time data security of a communications bus, according to an exemplary embodiment of the present invention.

In the fourth scenario which is one exemplary variation of the "cut through" scenario illustrated in FIG. 8, the hardware device 1301 is rather a part of an ECU connected to a CAN bus.

In the fourth scenario, a controller 1403 installed on the hardware device 1301 is connected to the ECU's CAN controller using two connections 1401, 1402—on one side, and to a transceiver 1006 that is a CAN PHY (physical) layer interface and is connected to the physical layer of the bus 1007, 1008—on the other side.

The hardware device 1301 therefore includes only a single transceiver 1006—i.e. a single CAN PHY (Physical) layer interface, that is connected to the physical layer 1007, 1008 of the bus.

The controller 1403 has a connection 1002 to a processor (say a CPU) 1001 and is also is also connected 1401 1402 to the ECU's own CAN controller. The controller 1403 is also connected 1004, 1005 with the transceiver 1006.

Optionally, the processor 1001 and the controller 1403 are a part of a same unit and communicate internally (via a bus 1002, a register interface, internal bus, or any other means of internal communication within a CPU/microprocessor/system on chip).

Alternatively, the processor 1001 is an external chip connected through a bus 1002 to the controller 1403. The bus 1002 used to connect the controller 1402 and processor 1001 may be based on SPI, I2C, UART, PCI, or any other chip interconnect protocol, as known in the art.

Figure 10:
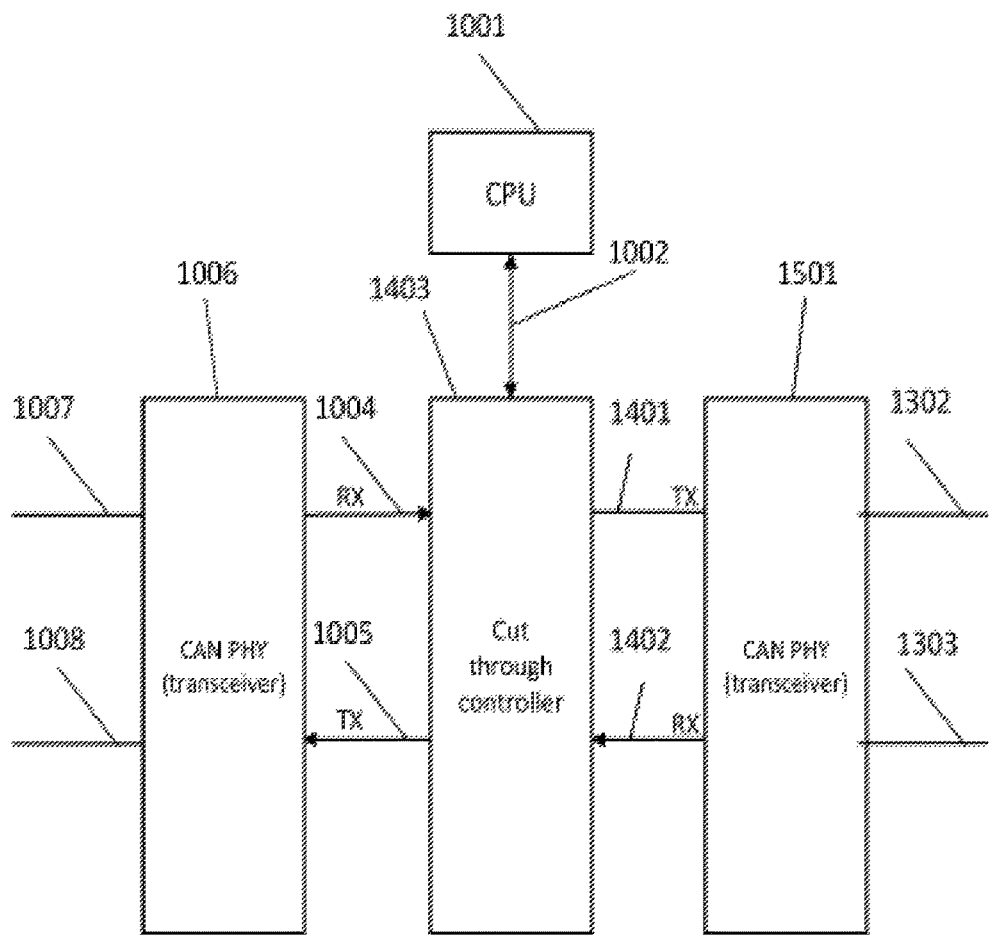
FIG. 10 is a simplified block diagram schematically illustrating a fifth scenario of real-time data security of a communications bus, according to an exemplary embodiment of the present invention.

Reference is now made to FIG. 10, which is a simplified block diagram schematically illustrating a fifth scenario of real-time data security of a communications bus, according to an exemplary embodiment of the present invention.

In the fifth scenario which is one exemplary variation of the "cut through" scenario illustrated in FIG. 8, the hardware device 1301 is rather a standalone device, with two transceivers (i.e. CAN PHY (Physical) layer interfaces) 1006, 1501.

A first transceiver 1006 is connected to a first bus segment's physical layer 1007, 1008, and a second transceiver 1501 is connected to a second bus segment's physical interface 1302, 1303. The hardware device 1301 is thus connected between the two bus segments.

The first transceiver 1006 is connected 1004, 1005 to the controller 1403 and the second transceiver 1501 is also connected 1401, 1402 to the controller 1403, and the controller 1403 is in communication 1201 with a processor 1001 (say CPU).

Optionally, the processor 1001 and the controller 1403 are a part of a same unit and communicate internally (via a bus 1002, a register interface or any other means of internal communication within a CPU/microprocessor/system on chip).

Alternatively, the processor 1001 is an external chip connected through a bus 1002 to the controller 1403. The bus 1002 used to connect the controller 1402 and processor 1001 may be based on SPI, I2C, UART, PCI, or any other chip interconnect protocol, as known in the art.

Figure 11:
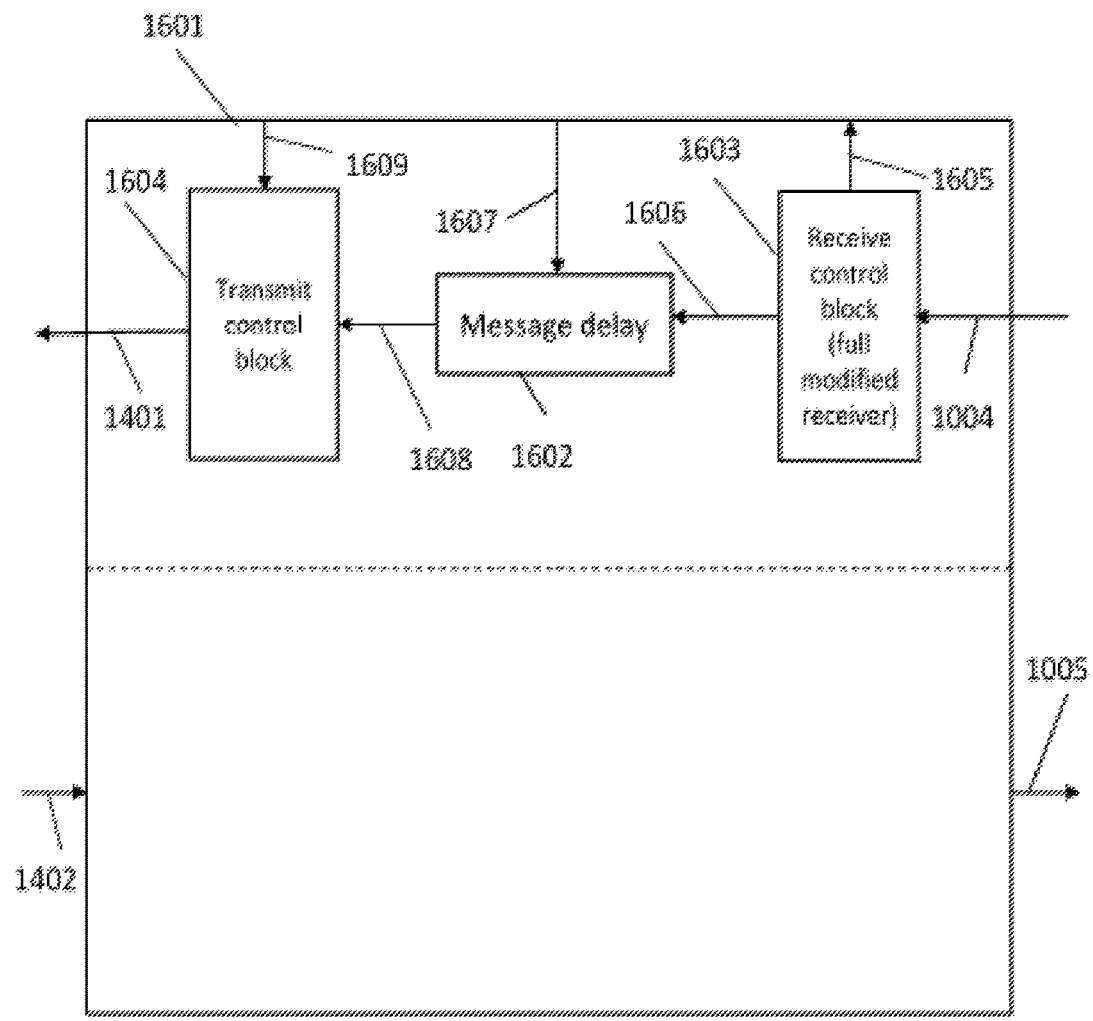
FIG. 11 is a simplified block diagram schematically illustrating a sixth scenario of real-time data security of a communications bus, according to an exemplary embodiment of the present invention.

Reference is now made to FIG. 11, which is a simplified block diagram schematically illustrating a sixth scenario of real-time data security of a communications bus, according to an exemplary embodiment of the present invention.

In a sixth scenario, also referred to hereinbelow as a "read only cut through" scenario, the hardware device of apparatus 3000 includes a controller 1601 that is under control of a processor 1001 (say CPU) on which apparatus 3000's parts 310-330, message delayer, message discarder, and optionally, other parts too, are implemented.

The controller 1601 of the sixth scenario cannot be used to generate any messages. However, the controller 1601 may be able to discard a message that the determiner 320 determines to be suspicious—by holding the message and not forwarding any part of the message, or to corrupt the message—by invalidating the message after starting to forward bits that make up the message to the bus.

Thus, in one example, the controller 1601 delays a message received from a first bus segment to a second bus segment through the controller 1601. As long as none of the bits of the message are forwarded to the second bus segment, the controller 1601 may be used (say by the message corrupter 330), to delete the message, by never forwarding any of the message's bits to the second bus segment.

In a second example, the forwarding of the message's bits received from the first bus segment to the second bus segment, through the controller 1601, has started, and thus the controller 1601 cannot be used to delete the message by not forwarding any of the message's bits. However, as long as the bits that make up the message are still being transmitted over the second bus segment, the controller 1601 may still be used by the message corrupter 330, to corrupt the message by changing at least one of the bits of the message on the second bus segment.

The controller 1601 includes a receive block 1603 that receives the message's logical level (TTL/CMOS) CAN data (i.e. bits of he message) from a CAN PHY physical layer interface 1006 through a connection 1004. The receive block 1603 parses the received bits into a format that the processor 1001 (say CPU) can read, and exposes the message (or an early part thereof) for the message receiver 310 implemented on the processor 1001 to read.

The message or early portion thereof is exposed to the processor 1001 through a connection 1605 between the controller's 1601 receive block 1603 and the processor 1001, for the message receiver 310 to read, (say on a buffer.)

An early portion of the message may thus be read by the message receiver 310 while the controller 1601's receive block 1603 is still in the midst of receiving the bits that make up the message. Alternatively or additionally, the message reader 310 may read the whole message when all message bits have been received.

While in the midst of receiving the message bits, the receive block 1603 also forwards message bits towards a transmit block 1604, as a bit stream, using a connection 1606.

Thus in the scenario, a modified CAN controller 1601 receive block 1603 may expose an early portion of the message to the processor (say CPU) 1001 while the message is still being transmitted over the bus, i.e. before the whole message is received on the bus and on the controller 1601. While exposing the early portion of the message (i.e. bits) in a processor-readable format to the processor 1001 and still receiving the message bits, the receive block 1603 also forwards the received message bits (as a bit stream, bit by bit) to a transmit block 1604.

Optionally, the receive block 1603 may also send an "Ack" signal through a connection 1005 after the whole message is received, provided the message is determined to be valid by the receive block 1603 (say according to CAN bus protocol rules), and determined to be non-suspicious by the determiner 320.

Optionally, the controller 1601 also includes a message delay block 1602.

The message delay block 1602 is connected 1608 1606 between the receive block 1603 and the transmit block 1604, and is capable of delaying transmission of the message bits between the two 1603, 1604, say by holding bits that the message delay block 1602 receives from the receive block 1603 in a buffer or instructing the receive block 1603 to stop sending the bits towards the message delay block 1602.

Optionally, the message delay block 1602 delays the transmission for a time period that is long enough for the determiner 320 to determiner if the message is suspicious.

Optionally, the message delay block 1602 can also store message bits forwarded by the receive block 1603, say when the transmit block 1604 is busy or when the bus segment that the message is destined for, is busy.

The time period of the delay may be fixed or rather be calculated specifically for each message, say according to a length indication present in the early portion of the message as read by the message reader 310.

In one example, the message delayer of apparatus 3000 calculates the length of the delay time period needed, and instructs the message delay block 1602 accordingly, using a connection 1607 between to the processor 1001 and the message delay block 1602. In a second example, the time period of the delay is rather determined by the message delay block 1602 itself.

The length of the time period of the delay may also be calculated even before the message's transmission starts. For example, after the DLC (number of data bytes) bits preceding the message body are received or after the ID field of the message is received, it may be possible to calculate how many more bytes are to be transmitted, and the expected time period until the end of the message.

Based on the expected time period until the end of the message, the time needed for the message determiner 320 to determine if the message is suspicious may be calculated so as to leave enough time for the determiner 320 to determine if the message is suspicious.

Optionally, the message delayer block 1602 waits for the bus segment 1401 that the message is destined for to be idle (and optionally, also stores whole messages on the message delay block's 1602 or rather on the processor's 1001 buffer).

The message delay block 1602 is only optional though, and when not included in the control 1601, the receive block 1603 and the transmit block 1604 may be directly connected.

Further, the message delay block 1602's delay period may be set to zero. Furthermore, the message delay by the message delay block 1602 may also be controlled by the processor (say CPU) 1001 through communication 1607 with the message delay block 1602.

In one example, when the message delay block 1602 becomes congested (say when a buffer in use by the message delay block 1602 is full), the message delay block 1602 may send an indication to the processor 1001, to the receive block 1603, or to both 1001 1603.

Optionally the processor 1001, and more specifically, the message discarder implemented on the processor 1001, may command the delay block 1602 to delete a message.

Optionally when the receive block 1603 receives a busy indication from the message delay block 1602, it does not send an "ack" signal. The transmit controller block 1604:

1. Receives the message bits, say as a bit stream (bit by bit), from the receive controller block 1603 (say through a connection 1606) directly, or rather from the delay block 1602 through a connection 1608, and forwards the bits to the bus.
2. Is able to delete the message, say when commanded to do so by the message discarder implemented on the processor, through a connection 1609.
3. May detect that the bus is not free over a connection 1402. In a CAN bus, a non-free bus is indicated by a CAN bus "end of frame" with "ack"—which is a sequence of eight consecutive recessive (1) bits. Upon the non-free bus detection, the transmit block 1604 may send a busy indication to the message delay block 1602. One alternative of implementing such a detection of a busy bus, includes using a receive block 1603 connected 1402 to the bus, and when getting that busy indication from the bus, sending the busy signal to the transmit block 1604.
4. Optionally discards all messages if commanded to, say by the message discarder, say by changing any recessive (T) bit which arrives on the bus to dominant (O'), as describe in further detail hereinabove.

Optionally, a baud rate used by both the receive block 1603 and the transmit block 1604, for forwarding the message bits, is controlled from the processor 1001, say by the message delayer of apparatus 3000.

The communication 1606 1608 between the receive block 1603 and the transmit block 1604 may be implemented using fast bit sampling (thereby avoiding loss of the specific CAN bits timing), by CAN bit sampling (at CAN bit rate), or in batches (i.e. several bits at a time)—for instance with parallel connections.

Optionally, the controller 1601 may also perform store and forward operations using the message delay block 1602, say if the bus segment 1401 that the message has to be transmitted on is busy, in which case, the forwarding of message bits commences only after the whole message is received.

Figure 12:
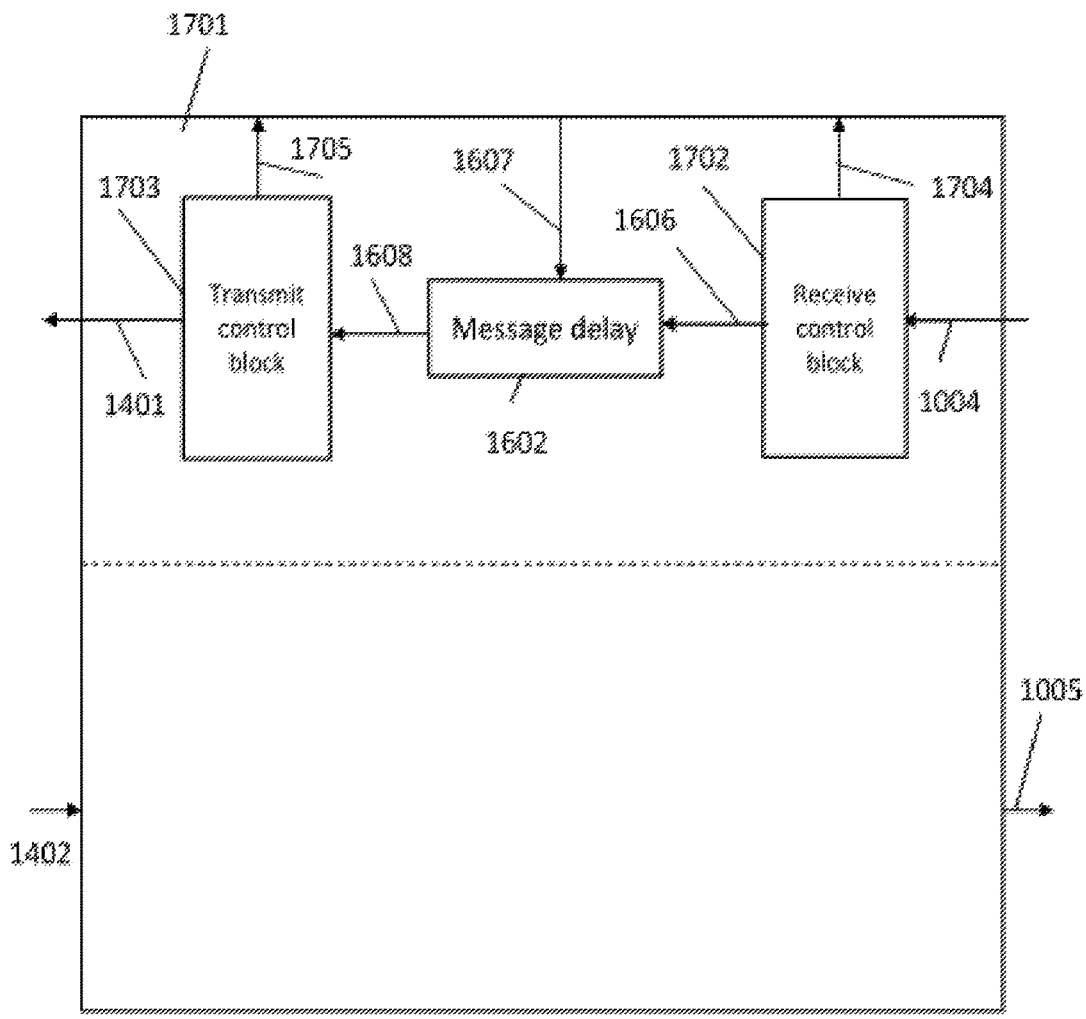
FIG. 12 is a simplified block diagram schematically illustrating a seventh scenario of real-time data security of a communications bus, according to an exemplary embodiment of the present invention.

Reference is now made to FIG. 12, which is a simplified block diagram schematically illustrating a seventh scenario of real-time data security of a communications bus, according to an exemplary embodiment of the present invention.

In a seventh scenario, also referred to hereinbelow as a "full cut through" scenario, the hardware device of apparatus 3000 includes a controller 1701 that is under control of a processor 1001 (say a CPU) on which apparatus 3000's parts 310-330, message delayer, message discarder, and optionally, other parts too, are implemented.

The controller 1701 implements a transmit block 1703 and a receive block 1702 that are modified versions of a standard CAN Controller's transmit block and receive block, thus allowing a sending of CAN messages from the processor 1001, using the transmit block 1703, through a connection 1705.

The transmit block 1703 can thus act as a transmit block of a standard CAN controller, by sending messages, as well as a block responsible only for corrupting or deleting messages (say as in the "read only cut through" exemplary scenario).

In the seventh scenario, while still in the midst of receiving the message's bits, from a first CAN bus 1004, the receive block 1702 parses and exposes an early portion of the message to the processor 1001, for the message receiver 310 to read, through a connection 1704, say on a buffer. Alternatively or additionally, the message reader 310 may read the whole message when all message bit have been received.

While still in the midst of receiving the message bits, the receive block 1702 also forwards the received message bits towards a transmit block 1703 connected to a second CAN bus 1401.

Optionally, the processor 1001 (say CPU) also stores messages in case the processor 1001 senses congestion in a message delay block's 1602 buffer, in order to send the messages afterwards.

If message sending is enabled by the processor 1001 through a connection 1705, the message bits are transmitted similarly to the "receive-only cut-through" scenario, to the second CAN bus 1401.

The processor 1001 can disable the direct route from the receive block 1702 to the transmit block 1703 (and even delete a message, say using the optional message delay block's 1602 through a connection 1607 or rather delay the message until sending the processor's 1001 own message).

In this way, the processor 1001 can transmit its own message if the processor decides to do so, using the transmit controller block 1703 through a connection 1705.

An arbitration of messages between the processor 1001 and the message delay block 1602 may thus be performed by the processor 1001.

For example, the processor 1001 may instruct the delay block 1602 to withhold the messages until the transmit block 1703 finishes sending a message sent by the processor 1001, over the bus 1401, and then instruct the delay block 1602 to resume sending the bits of the message received by the receive block 1702, using a connection 1607.

Alternatively, when the processor 1001 already has the message, say because the message is forwarded to the processor's 1001 message buffer earlier by the receiver block 1702 because the delay block's 1602 buffer is full, the processor 1001 may send the message himself.

The arbitration may also be done by the transmit block 1703, say by instructing the delay block 1602 to withhold messages (say by signaling to the delay block 1602 that the bus 1401 is busy), and when the finishing sending the processor's message, instructing the delay block 1602 to stop withholding messages.

In the instant scenario, the processor 1001 may also perform a "store and forward" operation, as known in the art—say by instructing the delay block 1602 to delay any message's forwarding until the message is received in full and is deemed to be not-suspicious. When the message is received in full and deemed to be not-suspicious, the processor 1001 may send the full message using the transmit block 1703, or instruct the delay block 1602 to forward the full message to the transmit block 1703.

Figure 13:
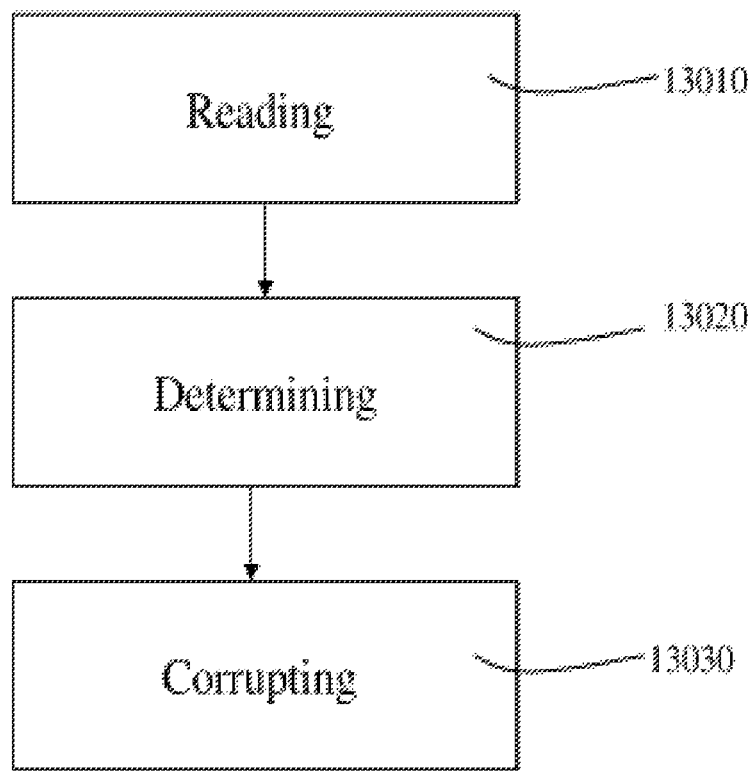
FIG. 13 is a simplified flowchart schematically illustrating an exemplary method of real-time data security of a communications bus, according to an exemplary embodiment of the present invention.

Reference is now made to FIG. 13, which is a simplified flowchart schematically illustrating an exemplary method of real-time data security of a communications bus, according to an exemplary embodiment of the present invention.

An exemplary method of real-time data security of a communications bus, according to an exemplary embodiment of the present invention, may be executed by a computer processor, an electric circuit, etc., or any combination thereof, say by apparatus 3000, as described in further detail hereinabove.

In the exemplary method, there is read 13010 at least an early portion of a message, during transmission of the message over a communications bus, say by the message reader 310, as described in further detail hereinabove.

The bus may be, but is not limited to a vehicle's communication bus such as a CAN bus, a Local Interconnect Network (LIN) bus, a Flex-Ray bus, a Vehicle Area Network (VAN) bus, etc., as known in the art.

That is to say that optionally, the early portion of the message is read 13010 before the whole message is read, as described in further detail hereinabove.

Optionally, the early portion is read 13010 even before the whole message is received on a hardware device on which the method is implemented (say the hardware device of apparatus 3000), as described in further detail hereinabove.

In one example, the early portion may be read 13010 by sampling or receiving content of a controller's buffer or receiving the early portion from the controller.

In the example, the controller is a part of the hardware device, and is electrically connected to the communications bus for sensing the bits present on the bus, or is otherwise able to sense the bits present on the bus, thus receiving the stream of bits that make up the message, as described in further detail hereinabove.

In the example, the early portion is read 13010 while the controller is still in the midst of receipt of the stream of bits that makes up the message—i.e. while the message is still being received on the hardware device.

Controllers connected to a bus (say a CAN bus), sense the content of the bus in real-time (i.e. immediately upon arrival of any bit of the message on the bus), thus enabling the reading 13010 of the early portion of the message before all message bits are received on the bus (i.e. before remaining bits of the message are even received on the bus).

The reading 13010 of the message while not all message bits have been received on the bus, may enable the invalidation or deletion of a suspicious message before the whole message is received on a bus connected to an ECU that the message is destined for, thus preventing the message's reading by the ECU's processor (say CPU or logic circuit), as described in further detail hereinbelow.

In a first example, the early portion of the message is read using electromagnetic induction, say using an induction probe that senses leading bits of the message while being transmitted over the bus, using electromagnetic induction, as described in further detail hereinabove.

In a second example, the hardware device on which the method is implemented is physically connected to the bus, or to a segment of the bus, and the early portion of the message is received on the hardware device through a wired connection to the bus, as described in further detail hereinabove.

The early portion may include, for example, one or more bytes of the message that are read 13010 prior to reading the whole message—i.e. one or more of the message's leading bytes.

The read 13010 early portion of the message may thus be either a consecutive or a non-consecutive early portion of the message, say a portion made of non-consecutive ones of the bytes that are read prior to reading of the whole message. Further, the read bytes may make up a small portion of the message, or rather a large part of the message, but not entire message.

Next, there is determined 13020 whether the message is suspicious according to at least one predefined rule applied on the read 13010 early portion of the message, or rather on the whole message—i.e. not only the early portion thereof (say when whole message is read by the message reader 310), as described in further detail hereinabove.

The one or more rules may include, but are not limited to one or more rules applied on properties of the message, on the message header, on content of one or more message fields contained in the read 13010 portion (or whole message), on the message length, on the sending time (say date, hour, etc.) of the message, etc., or any combination thereof.

The one or more rules may further be based on a black list of senders, on a white list of senders, etc., or any combination thereof, as known in the art.

The rules may additionally or alternatively include rules that are based on context of the message's receipt on the bus, such as message rate (say a sudden rise in the number of messages sent over the bus during a denial of service attack), properties of a message received just before the message, etc., as known in the art.

Optionally, the one or more rules are predefined by a programmer, circuit designer, or user, say by programming, circuit designing, or using a GUI (Graphical User Interface), as described in further detail hereinabove.

When there is determined 13020 that the message is suspicious, at least a part of the message is corrupted 13030, say by the message corrupter 330, as described in further detail hereinabove.

Optionally, the message is corrupted 13030 by changing one or more bits of the message, say for introducing an error into the message and thereby invalidating the message, as described in further detail hereinabove.

Optionally, the message is corrupted 13030 by changing one or more bits of the message, on the communications bus that the message is communicated over when read 13010—say using an induction probe, as described in further detail hereinabove, or rather on a second communications bus—say a one that is used to send the message from the hardware device of apparatus 3000—see for example, in one of the "cut-through" scenarios, as described in further detail hereinabove.

Optionally, the corruption 13030 of the message renders the message invalid according to a communications protocol of the communications bus, say according to the CAN bus protocol implemented on a vehicle's or factory's CAN bus, as described in further detail hereinabove.

Optionally, the message determined 13020 to be suspicious is corrupted 13030 before all bits of the message are received on the communications bus, as described in further detail hereinabove.

In a first example, the communications bus is a CAN (Control Area Network) bus and the message is corrupted 13030 by inserting a frame that is equivalent to a CAN Error Frame into the CAN bus when the message is still being transmitted over the communication bus, as described in further detail hereinabove.

The changing of bits of the message being transmitted over the bus, however, can only be done by changing one or more recessive (T) ones of the message's bits to dominant (O). The inserted frame equivalent to a CAN Error Frame includes the Error Flag of an Active Error Frame, but not necessarily the Error Delimiter, as described in further detail hereinabove.

Optionally, by changing the one or more bits of the message, there is left a sequence of at least six consecutive identical bits in the message, and the message is thereby invalidated by insertion of a CAN stuffing error into the message, as described on further detail hereinabove.

Optionally, the early portion read 13010 (say by the message reader 310) includes the entire message but the CRC (Cyclic Redundancy Check) associated with the message, and the corrupting of the messages includes changing at least one bit of the CRC associated with the message on the bus, and thereby invalidating the message, as described on further detail hereinabove.

Optionally, the exemplary method further includes an optional step of delaying transmission of at least a part of the message over the communications bus, say by the message delayer of apparatus 3000, as described in further detail hereinabove.

In some examples, the transmission is delayed until there is determined 13020 that the message is not suspicious, or for a period of time likely to provide enough time for the determining 13020 whether the message is suspicious, as described in further detail hereinabove.

Optionally, the exemplary method further includes monitoring the bus, say by the bus monitor of apparatus 3000, and upon detecting that the bus is busy, delaying transmission of at least a part of the message over the communications bus, as described in further detail hereinabove.

Optionally, the exemplary method further includes an optional step of deleting at least a part of the message (say by the message discarder of apparatus 3000), as described in further detail hereinabove.

Figure 14:
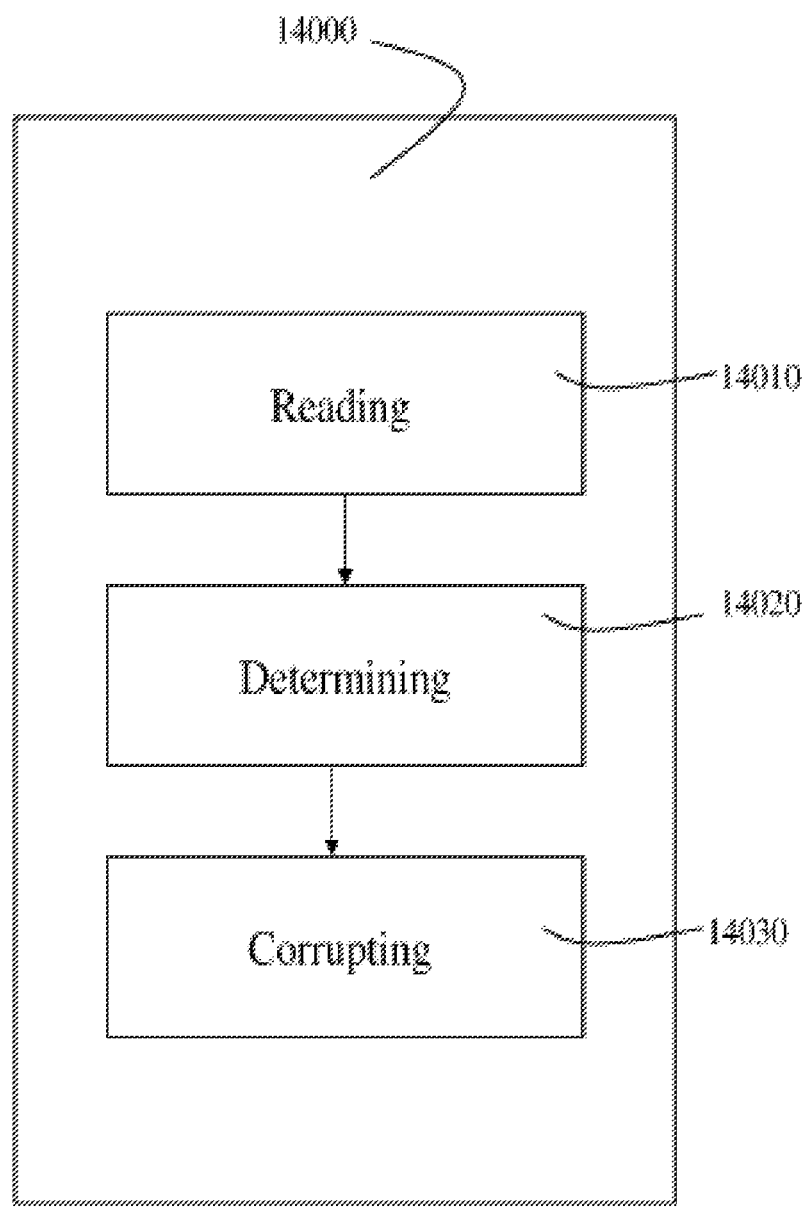
FIG. 14 is a simplified block diagram schematically illustrating a computer readable medium storing computer executable instructions for performing steps of real-time data security of a communications bus, according to an exemplary embodiment of the present invention.

Reference is now made to FIG. 14, which is a simplified block diagram schematically illustrating a computer readable medium storing computer executable instructions for performing steps of real-time data security of a communications bus, according to an exemplary embodiment of the present invention.

According to an exemplary embodiment of the present invention, there is provided a non-transitory computer readable medium 14000 which stores computer executable instructions for performing steps of real-time data security of a communications bus.

The computer readable medium 14000 may include, but is not limited to: an SRAM (Static Random Access Memory), a Flash Memory, an EEPROM (Electrically Erasable Programmable Read-Only Memory), an EPROM (Erasable ROM), a RAM (Rapid Access Memory), a DRAM (Dynamic RAM), a ROM (Read Only Memory), a PROM (Programmable ROM), a Micro SD (Secure Digital) Card, a CD-ROM, a Solid State Drive (SSD), a USB-Memory, a Hard Disk Drive (HDD), etc., as known in the art.

For example, the computer readable medium 14000 may include one or more memory elements or more complete memory blocks or components that are included in an electric circuit (say an FPGA), as described in further detail hereinabove.

The computer readable medium 14000 stores computer executable instructions, for performing steps of the exemplary method described in further detail hereinabove and illustrated using FIG. 13.

For example, the medium 14000 stores computer executable instructions 14010 for performing the reading 13010 step of the method, computer executable instructions 14020 for performing the determining 13020 step of the method, and computer executable instructions 14030 for performing the corrupting 13030 step of the method.

It is expected that during the life of this patent many relevant devices and systems will be developed and the scope of the terms herein, particularly of the terms "Bus", "CAN", "LIN", "Flex-Ray", "VAN", "Ethernet", "Controller", "CPU", "Processor", "Computer" and "ECU", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention

The invention claimed is:

1. A device for automotive physical layer handling and real-time security for use between an additional device and a vehicle bus in a vehicle for communicating between multiple Electronic Control Units (ECUs) using frames, each of the frames comprises an identifier of the respective frame type or content, or of the ECU that transmitted the frame to the vehicle bus, the device comprising:
   a first port coupled for receiving analog differential signals from, and for transmitting analog differential signals to, the vehicle bus;
   a first transceiver coupled to the first port for transmitting to, and for receiving from, the vehicle bus;
   a memory storing a list of identifiers and coupled to the first transceiver;
   a second port coupled to the first transceiver for coupling to the additional device; and
   a single enclosure for housing the first and second ports, the first transceiver, and the memory,
   wherein the device is configured to receive a frame from the additional device via the second port, to retrieve an identifier from the received frame, to determine if the retrieved identifier is in the list, and responsive to the determining, to change the frame and to transmit the changed frame to the vehicle bus by the first transceiver.

2. The device according to claim 1, wherein the received frame is changed if determined that the respective retrieved identifier is in the list, or wherein the received frame is changed if determined that the respective retrieved identifier is not in the list.

3. The device according to claim 1, further operative to responsive to the determining, to transmit the received frame unchanged to the vehicle bus via the first transceiver or to discard the received frame.

4. The device according to claim 1, further operative to receive multiple additional frames from the additional device via the second port, and for each of the multiple additional frames: to retrieve the identifier from each of the received additional frame, determine if the retrieved identifier is in the list, and responsive to the determining, to change the frame and to transmit the changed additional frame to the vehicle bus via the first transceiver, or to transmit the additional frame unchanged to the vehicle bus via the first transceiver.

5. The device according to claim 1, further comprising a third port that is the same as, or different from, the second port, and wherein the device is further operative to send a signal over the third port responsive to the determining.

6. The device according to claim 1, further comprising an additional list in the memory that is the same as, identical to, or different from, the list, wherein the device is configured to receive an additional frame from the vehicle bus via the first port, to retrieve the identifier from the received additional frame, to determine if the retrieved identifier is in the additional list, and responsive to the determining, to change the additional frame and to transmit the changed additional frame to the additional device via the second port.

7. The device according to claim 6, further operative to responsive to the determining, to transmit the received additional frame unchanged to the additional device via the second port, or responsive to the determining, to discard the received additional frame.

8. The device according to claim 6, wherein the communication over the vehicle bus uses, or is based on, a protocol that defines a physical and a data link layer, and wherein the first transceiver is operative to handle the physical layer.

9. The device according to claim 8, for use with a controller for handling the data link layer, wherein the additional device comprises, or consists of, the controller, and wherein the single enclosure comprises the controller.

10. The device according to claim 9, wherein the communication over the vehicle bus uses, is according to, or is based on, Control Area Network (CAN) or Control Area Network—Flexible Data-rate (CAN-FD) standard, wherein the transceiver is respectively a CAN or CAN-FD transceiver, and wherein the controller is respectively a CAN or CAN-FD controller.

11. The device according to claim 9, wherein the controller comprises a pin for connecting to the device, and wherein the device is further operative to send a signal to the controller over the pin in response to the determining for interrupting the controller operation.

12. The device according to claim 6, wherein the vehicle bus uses, is according to, or is based on, a standard protocol, and wherein the changed frame or the changed additional frame is not compatible with, or is not according to, the standard protocol.

13. The device according to claim 12, wherein the change of the frame or the change of the additional frame comprises a change of multiple consecutive bits in the received frame.

14. The device according to claim 12, wherein the changing of the frame or the changing of the additional frame comprises a change of one or more consecutive or non-consecutive bits in a field of the received frame.

15. The device according to claim 6, wherein the changed frame or changed additional frame comprises six identical consecutive bits.

16. The device according to claim 6, wherein the communication over the vehicle bus uses, is according to, or is based on, Control Area Network (CAN) or Control Area Network—Flexible Data-rate (CAN-FD) standard, and wherein the field is Cyclic Redundancy Check (CRC) or the changed frame comprises inserted CAN stuffing error to the received frame.

17. The device according to claim 6, wherein the communication over the vehicle bus uses, or is based on, Control Area Network (CAN) and the first transceiver comprises a CAN transceiver, wherein the communication over the vehicle bus uses, or is based on, Control Area Network—Flexible Data-rate (CAN-FD) standard and the first transceiver comprises a CAN-FD transceiver, or wherein the standard protocol consists of, employs, or is based on, a Local Interconnect Network (LIN), a Flex-Ray bus, a Vehicle Area Network (VAN), or an Ethernet bus.

18. The device according to claim 6, wherein the received additional frame is changed if determined that the respective retrieved identifier is in the additional list, or wherein the received additional frame is changed if determined that the respective retrieved identifier is not in the additional list.

19. The device according to claim 1, wherein the frame comprises at least a first part followed by a second part, wherein the device is configured to receive the first part via the second port, to retrieve the respective identifier from the received first part of the frame, determine if the retrieved identifier is in the list, and responsive to the determining, to change the second part of the frame, and to transmit the changed second part of the frame to the vehicle bus via the first port, so that the changed frame is rendered ineligible to be properly received by an ECU connected to the vehicle bus.

20. The device according to claim 1, further operative to receive multiple frames from the vehicle bus by the transceiver, to retrieve the identifier from each of the received frames, to determine if the retrieved identifier is in the list, and responsive to the determining, to change the frame and to transmit the changed frame to the additional device via the second port, or to transmit the frame unchanged to the additional device via the second port.

21. The device according to claim 1, wherein the single enclosure consists of, or comprises, an Integrated Circuit (IC).

22. The device according to claim 1, wherein the device consists of, comprises, or is part of, a gateway or a bridge, or wherein the single enclosure consists of, comprises, or is part of, a Central Processor Unit (CPU), a controller chip, a Field-Programmable Gate Array (FPGA), or an Application Specific Integrated Circuit (ASIC).

23. The device according to claim 1, further comprising in the single enclosure a software and a processor for executing the software, wherein the processor is coupled to control or use the first transceiver and the memory, and wherein the processor consists of, or comprises, a Central Processor Unit (CPU), a controller, an Field-Programmable Gate Array (FPGA), or an Application Specific Integrated Circuit (ASIC).

24. The device according to claim 1, further comprising a buffer coupled to the first transceiver for sequentially storing a series of bits received from the first transceiver, wherein the vehicle bus uses two or more conductors as a communication medium, and wherein the first port comprises, or consists of, a connector for connecting to the medium.

25. The device according to claim 1, further comprising a second transceiver coupled between the second port and the first transceiver, for transmitting to, and for receiving from, the additional device.

26. The device according to claim 25, wherein the communication with the additional device is according to a serial interconnection protocol that is a Serial Peripheral Interface (SPI), Inter-Integrated Circuit (I2C), or Universal Asynchronous Receiver/Transmitter (UART).

27. The device according to claim 1, wherein the communication with the additional device is via an additional vehicle bus using a protocol that is the same as, or different from, a protocol used by the vehicle bus, and wherein the first transceiver is operative to receive from, or transmit to, the vehicle bus, by using fast bit sampling for avoiding loss of bits timing or by using batch bits sampling.

28. The device according to claim 1, further operative to sense or control a rate of frames that are received from the second port or is operative to sense or control a rate of frames that are transmitted to the vehicle bus via the first transceiver.

29. The device according to claim 1, further operative to sense or control a rate of frames that are received from the vehicle bus via the first transceiver or is operative to sense or control a rate of frames that are transmitted to the additional device via the second port.

30. The device according to claim 1, further configured for real-time detecting and handling of malicious messages carried over the vehicle bus or received from the additional device, wherein the vehicle is an autonomous or self-driving car, and wherein the single enclosure further comprising the additional device.

* * * * *